US010040548B2

(12) United States Patent
Alzahrani

(10) Patent No.: US 10,040,548 B2
(45) Date of Patent: Aug. 7, 2018

(54) MULTI-MODE AERIAL VEHICLE

(71) Applicant: Saeid A. Alzahrani, Prescott, AZ (US)

(72) Inventor: Saeid A. Alzahrani, Prescott, AZ (US)

(*) Notice: Subject to any disclaimer, the term of this patent is extended or adjusted under 35 U.S.C. 154(b) by 228 days.

(21) Appl. No.: 15/195,238

(22) Filed: Jun. 28, 2016

(65) Prior Publication Data

US 2017/0369161 A1 Dec. 28, 2017

(51) Int. Cl.
| | | |
|---|---|---|
| *B64C 29/00* | (2006.01) | |
| *B64C 5/02* | (2006.01) | |
| *B64C 27/52* | (2006.01) | |
| *B64C 3/38* | (2006.01) | |
| *B64C 9/00* | (2006.01) | |
| *B64C 25/32* | (2006.01) | |
| *B64C 23/06* | (2006.01) | |

(52) U.S. Cl.
CPC ............ *B64C 29/0033* (2013.01); *B64C 3/38* (2013.01); *B64C 5/02* (2013.01); *B64C 9/00* (2013.01); *B64C 23/065* (2013.01); *B64C 25/32* (2013.01); *B64C 27/52* (2013.01)

(58) Field of Classification Search
CPC ............................ B64C 29/0033; B64C 27/52
See application file for complete search history.

(56) References Cited

U.S. PATENT DOCUMENTS

| 3,291,242 A | 12/1966 | Tinajero |
| D274,511 S | 7/1984 | Clifton |
| D274,512 S | 7/1984 | Clifton |
| D302,676 S | 8/1989 | Clifton |
| 4,880,071 A | 11/1989 | Tracy |
| D311,719 S | 10/1990 | Haga |
| 5,823,468 A | 10/1998 | Bothe |
| 6,708,920 B2 | 3/2004 | Fukuyama |
| D493,411 S | 7/2004 | Fong |

(Continued)

FOREIGN PATENT DOCUMENTS

RU  2 283 795 C1  9/2006

OTHER PUBLICATIONS

Yongjun Seo, et al., "Modeling and Attitude Control of Tri-Tilt Ducted Fan Vehicle", AIAA Guidance, Navigation, and Control Conference, Sci Tech, http://arc.aiaa.org/doi/abs/10.2514/6.2016-0103, 2016, 3 pages (Abstract only).

(Continued)

*Primary Examiner* — Brian M O'Hara
(74) *Attorney, Agent, or Firm* — Oblon, McClelland, Maier & Neustadt, L.L.P.

(57) ABSTRACT

A multi-mode aerial vehicle hybrid wing includes a fixed wing configured to extend from a side of an elongated fuselage and double over its longitudinal axis, a tilt wing attached at a first side to a free end of the fixed wing wherein the tilt wing is rotatable ninety degrees about its axis, and a duct attached to a second side of the tilt wing. The duct includes a plurality of pivotal control surfaces positioned at a top entrance of the duct, dual counter-rotating rotors positioned at an underside of the duct, a plurality of cross stators positioned at a back entrance of the duct, and a plurality of stator pivotal control surfaces within each of the cross stators of the duct. The multi-mode aerial vehicle hybrid wing also includes a winglet attached to the duct opposite to the tilt wing.

19 Claims, 29 Drawing Sheets

(56) References Cited

U.S. PATENT DOCUMENTS

| | | | |
|---|---|---|---|
| D500,008 S | 12/2004 | Bulaga | |
| 6,843,447 B2 | 1/2005 | Morgan | |
| 6,886,776 B2 | 5/2005 | Wagner et al. | |
| 6,892,980 B2 | 5/2005 | Kawai | |
| 7,246,769 B2 | 7/2007 | Yoeli | |
| 7,410,122 B2 | 8/2008 | Robbins et al. | |
| 7,472,863 B2 | 1/2009 | Pak | |
| 7,717,368 B2 | 5/2010 | Yoeli | |
| 7,789,342 B2 | 9/2010 | Yoeli | |
| 7,806,362 B2 | 10/2010 | Yoeli | |
| 7,857,253 B2 | 12/2010 | Yoeli | |
| 7,857,254 B2 | 12/2010 | Parks | |
| 7,874,513 B1 | 1/2011 | Smith | |
| 7,918,416 B2 | 4/2011 | Yoeli | |
| 7,946,528 B2 | 5/2011 | Yoeli | |
| 8,020,804 B2 | 9/2011 | Yoeli | |
| 8,181,903 B2 | 5/2012 | Posva | |
| D665,333 S | 8/2012 | Oliver | |
| 8,342,441 B2 | 1/2013 | Yoeli | |
| 8,496,200 B2 | 7/2013 | Yoeli | |
| 8,622,335 B2 | 1/2014 | Yoeli | |
| 8,777,150 B2 | 7/2014 | Wang | |
| 8,800,912 B2 | 8/2014 | Oliver | |
| 8,833,692 B2 | 9/2014 | Yoeli | |
| 8,876,038 B2 | 11/2014 | Yoeli | |
| 9,045,226 B2 * | 6/2015 | Piasecki | G05D 1/102 |
| 2007/0018035 A1 | 1/2007 | Saiz et al. | |
| 2007/0246601 A1 | 10/2007 | Layton | |
| 2009/0127379 A1 | 5/2009 | Lugg | |
| 2012/0043413 A1 | 2/2012 | Smith | |
| 2012/0091257 A1 | 4/2012 | Wolff et al. | |
| 2013/0099065 A1 * | 4/2013 | Stuhlberger | B64C 29/0033 244/7 C |
| 2014/0151502 A1 | 6/2014 | Kosheleff | |
| 2014/0339372 A1 | 11/2014 | Dekel et al. | |
| 2015/0274289 A1 * | 10/2015 | Newman | B64C 27/26 244/12.4 |
| 2017/0036760 A1 * | 2/2017 | Stan | B64C 29/0033 |
| 2017/0369161 A1 * | 12/2017 | Alzahrani | B64C 29/0033 |
| 2018/0065740 A1 * | 3/2018 | Vondrell | B64C 29/0033 |

OTHER PUBLICATIONS

"A3 EDF drone", Nicklindenmuth, http://www.thingiverse.com/thing:687381, Feb. 18, 2015, 3 pages.

Batchu Chandra Sekhar, et al., Studies on the Reactivity of New Types of Tetracyclic-1,5-Benzoxazepines: Part V, Department of Chemistry, Indian Institute of Technology, XP 55196157, Mar.-Apr. 2001, 1 page (Abstract only).

R. Saiganesh, et al., "A Selective Cathodic Reduction of (β-Chlorovinylimines in N, N' Dimethylformamide", Tetrahedron Letters, vol. 30, No. 13, 1989, pp. 1711-1714.

* cited by examiner

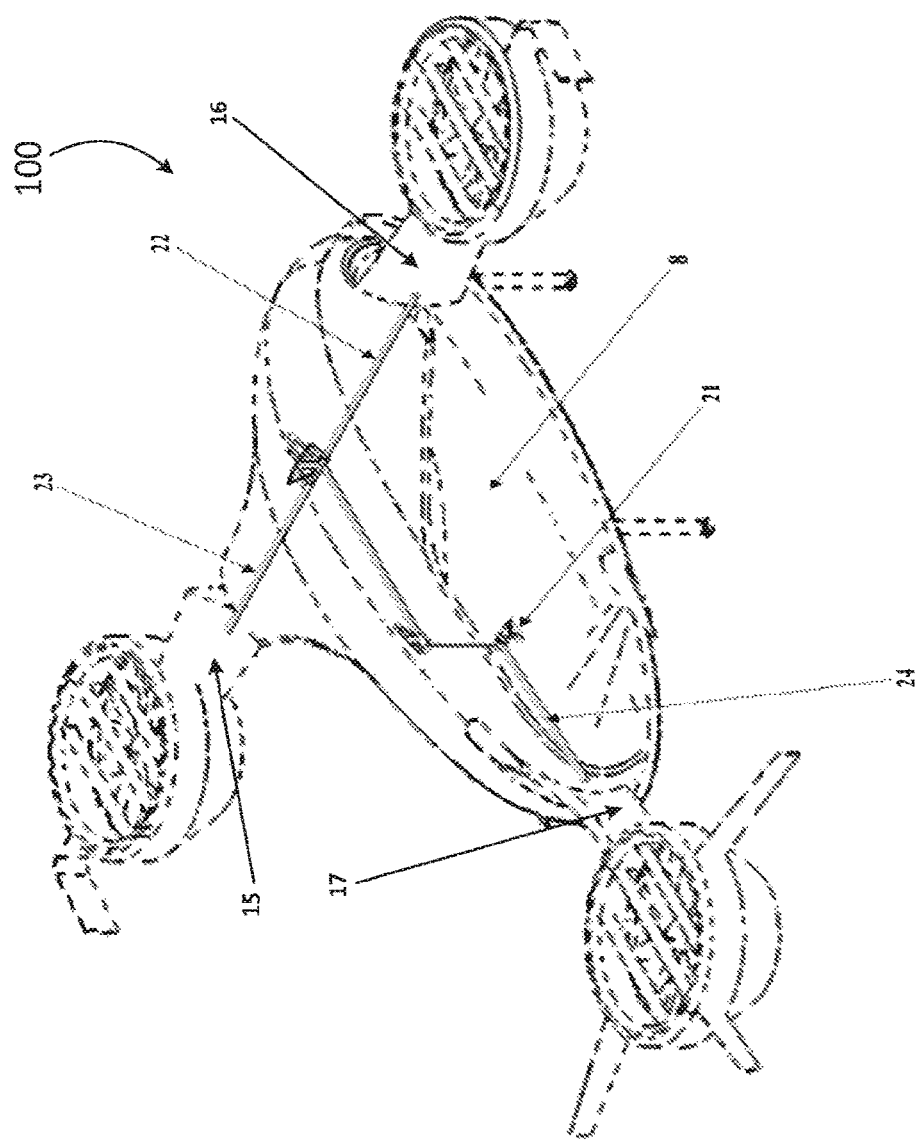

MULTI-MODE AERIAL VEHICLE

BACKGROUND

Grant of Non-Exclusive Right

This application was prepared with financial support from the Saudi Arabian Cultural Mission, and in consideration therefore the present inventor(s) has granted The Kingdom of Saudi Arabia a non-exclusive right to practice the present invention.

DESCRIPTION OF THE RELATED ART

The aviation industry has worked at improving vertical take-off and landing (VTOL) and short take-off and landing (STOL) aerial vehicles. The use of VTOL/STOL aerial vehicles is significantly efficient. One challenge has been to design an aerial vehicle that can take-off, land, and hover like a helicopter and also possess speed, range, payload capacity, and operational features of a fixed-wing aircraft.

The thrust of a nozzle-vectored fixed-wing VTOL/STOL aerial vehicle is generated by a jet engine or a turbo-fan engine which is vectored, channeled, and directed by nozzles downward to provide vertical lift. It is subsequently redirected horizontally for horizontal flight. However, one problem of this aerial vehicle is the large amount of fuel required to accomplish full throttle for the aerial vehicle to hover. As a result, the aerial vehicle's horizontal flight times and ranges are reduced.

Helicopters are a commonly used rotary-wing aerial vehicle and are considered by many to be successful VTOL/STOL aerial vehicles. However, there are performance and safety issues with a helicopter. The performance of a helicopter is limited by its forward speed. It also has a limited range due to its inefficiency compared to a fixed-wing aircraft in which most of the lifting force is provided by the wings when it moves forward. Helicopter safety is limited due to problems, such as a loss of the tail rotor or rotor strike, ground resonance, loss of control during negative G flight, dynamic roll-over, anti-torque rotor failures, auto rotations, and the requirement to find an open landing site.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

In one embodiment, a multi-mode aerial vehicle includes an elongated fuselage having a front end, a rear end with a curved guide slot, a right side, a left side, and a wing-in-ground (WIG) effect bottom. The multi-mode aerial vehicle also includes a right-fixed wing extending from the right side of the elongated fuselage, a right tilt wing attached at a first side to a free end of the right fixed wing wherein the right tilt wing is rotatable ninety degrees about its axis, a right duct attached to a second side of the right tilt wing, and a right winglet attached to the right duct opposite to the right tilt wing. The multi-mode aerial vehicle also includes a left-fixed wing extending from the left side of the elongated fuselage, a left tilt wing attached at a first side to a free end of the left fixed wing wherein the left tilt wing is rotatable ninety degrees about its axis, a left duct attached to a second side of the left tilt wing, and a left winglet attached to the left duct opposite to the left tilt wing. The multi-mode aerial vehicle also includes a tilt tail located within the curved guide slot at the rear end of the elongated fuselage, wherein the tilt tail is rotatable ninety degrees within the curved guide slot. The multi-mode aerial vehicle also includes a tilting mechanism coupling, via a gearbox, a right shaft integrated with the right tilt wing, a left shaft integrated with the left tilt wing, and a rear shaft integrated with the tilt tail within the curved guide slot. The multi-mode aerial vehicle also includes a rear duct attached to the tilt tail, wherein the rear duct has a vertical stabilizer, a right horizontal stabilizer, and a left horizontal stabilizer.

In one embodiment, a multi-mode aerial vehicle hybrid wing includes a fixed wing configured to extend from a side of an elongated fuselage and to be doubled over its longitudinal axis, a tilt wing attached at a first side to a free end of the fixed wing wherein the tilt wing is rotatable ninety degrees about its axis, and a duct attached to a second side of the tilt wing. The duct includes a plurality of pivotal control surfaces positioned at a top entrance of the duct, dual counter-rotating rotors positioned at an underside of the duct, an engine located centrally within the duct, a plurality of cross stators positioned at a back entrance of the duct, and a plurality of stator pivotal control surfaces within each of the cross stators of the duct. The multi-mode aerial vehicle hybrid wing also includes a winglet attached to the duct opposite to the tilt wing.

In one embodiment, a multi-mode aerial vehicle hybrid tail includes a tilt-tail configured to fit within a curved guide slot at a rear end of an elongated fuselage wherein the tilt tail is rotatable ninety degrees within the curved guide slot, and a duct attached to the tilt-tail at an opposite end to the curved guide slot. The duct includes a plurality of pivotal control surfaces at a top entrance of the duct, dual counter-rotating rotors positioned at an underside of the duct, a plurality of cross stators positioned at a back entrance of the duct, and a plurality of stator pivotal control surfaces within each of the cross stators of the duct. The multi-mode aerial vehicle hybrid tail also includes a vertical stabilizer attached to the duct at an opposite side to the tilt-tail, a first horizontal stabilizer attached to the duct at a first side, and a second horizontal stabilizer attached to the duct at a second opposite side.

The foregoing paragraphs have been provided by way of general introduction, and are not intended to limit the scope of the following claims. The described embodiments will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 20 is a schematic perspective view illustrating a tilting mechanism according to one embodiment;

DETAILED DESCRIPTION

Embodiments described herein provide a multi-mode aerial vehicle that is capable of vertical take-off and landing (VTOL), short take-off and landing (STOL), horizontal take-off and landing (HTOL), and configured to skim, boat, and cruise over water surfaces. In an embodiment, the multi-mode aerial vehicle is a manned air, land, and water multi-purpose aerial vehicle. The multi-mode aerial vehicle can take off and land from a wide variety of locations without the requirement of an airport runway or a landing pad.

The multi-mode aerial vehicle described herein has the flexibility and attributes of helicopters, fixed-wing aircrafts, and WIG vehicles. The multi-mode aerial vehicle is comparable in mission and output to helicopters, fixed-wing aircrafts, seaplanes, and hovering aircrafts combined.

An efficient way to achieve a combination of a fixed-wing configuration, a tilt-wing configuration, a ducted fan configuration, a counter-rotating rotor configuration, and a WIG configuration is by combining all of them in a tilt-wing tri-ducted fan platform. Advantages of this combination include higher aerodynamic performance, higher stability, greater controllability, better maneuverability, safer operating conditions, and quieter flight capabilities. A tilt-wing tri-ducted fan platform reduces the likelihood of failure, and it streamlines development, reduces costs, and saves space. In addition, it reduces the complexity of the aerial vehicle by using a multi-purpose platform, rather than a separate configuration for each function.

Figure 1:
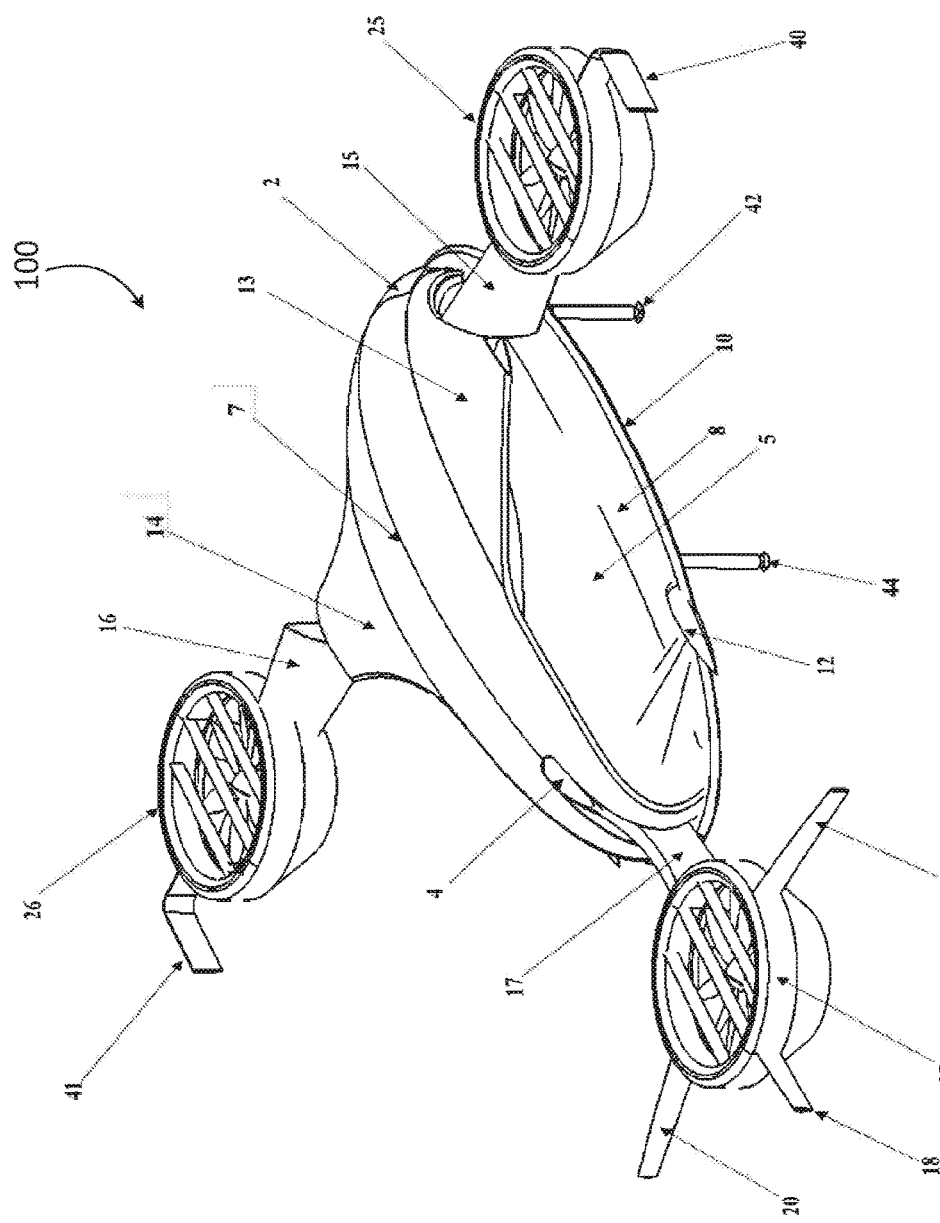
FIG. 1 is a perspective schematic view of a multi-mode aerial vehicle in a vertical take-off and landing (VTOL) mode according to one embodiment.
Figure 2:
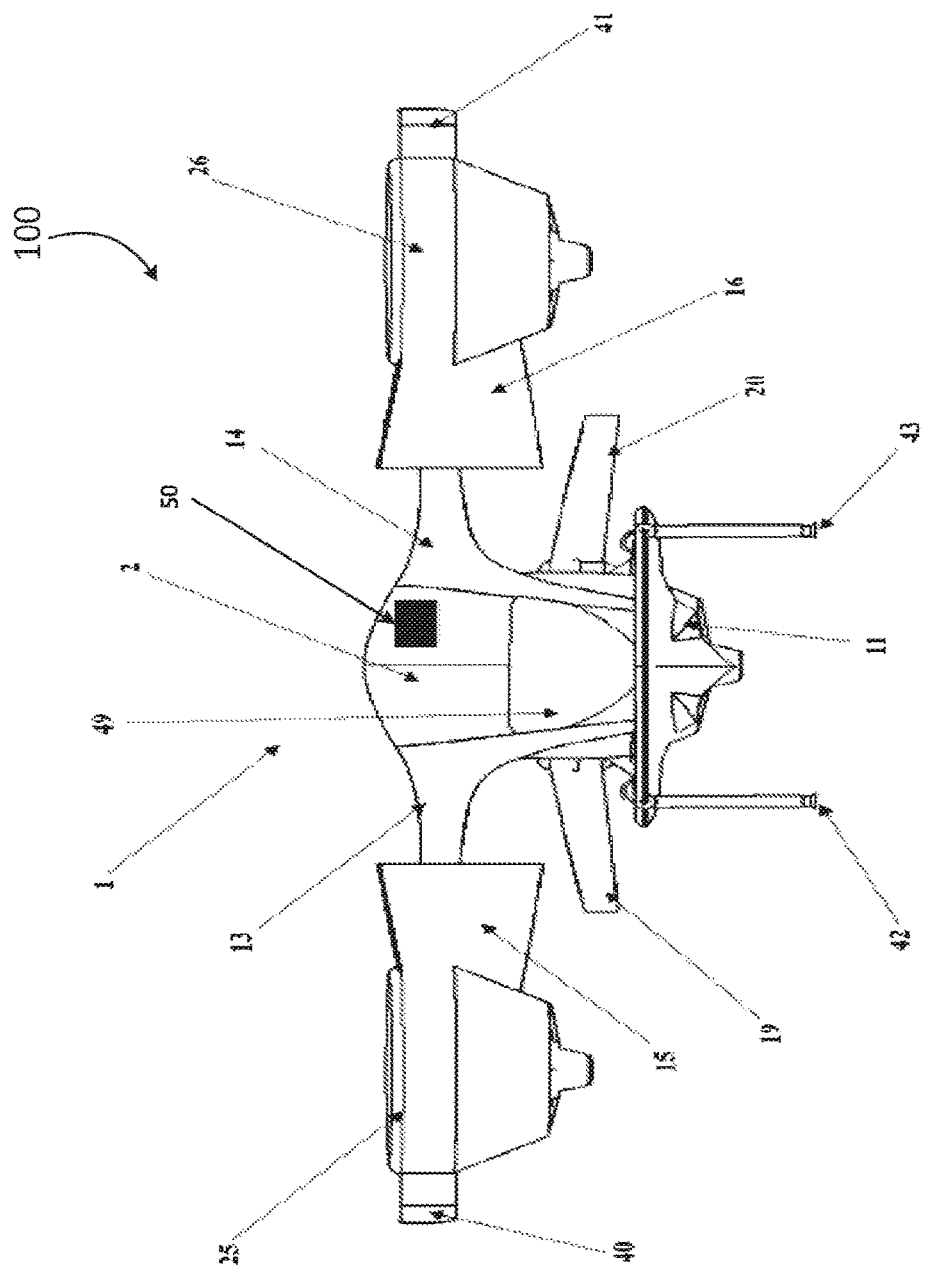
FIG. 2 is a front schematic view of a multi-mode aerial vehicle in a VTOL mode according to one embodiment.
Figure 3:
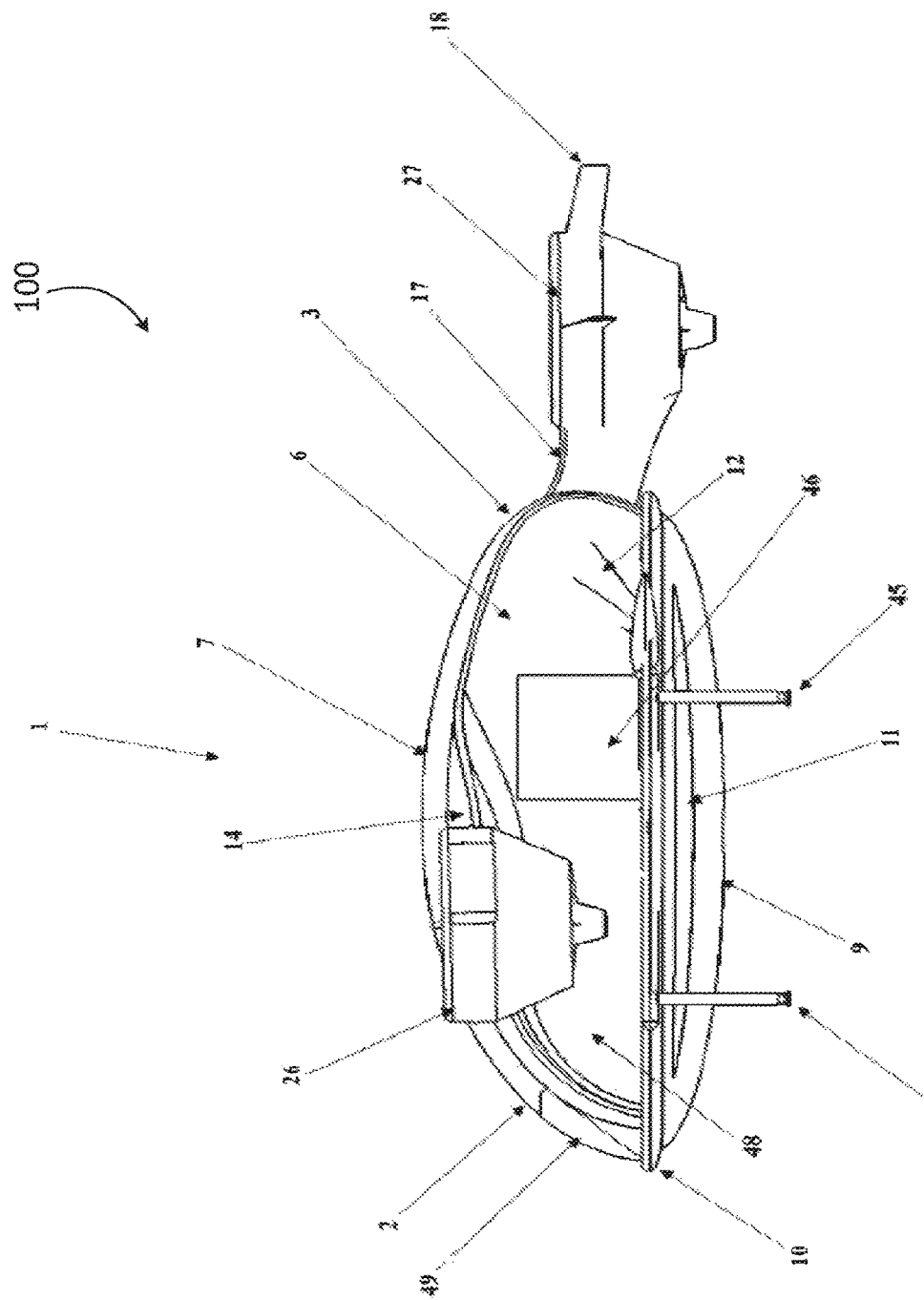
FIG. 3 is a left-side schematic view of a multi-mode aerial vehicle in a VTOL mode according to one embodiment.
Figure 4:
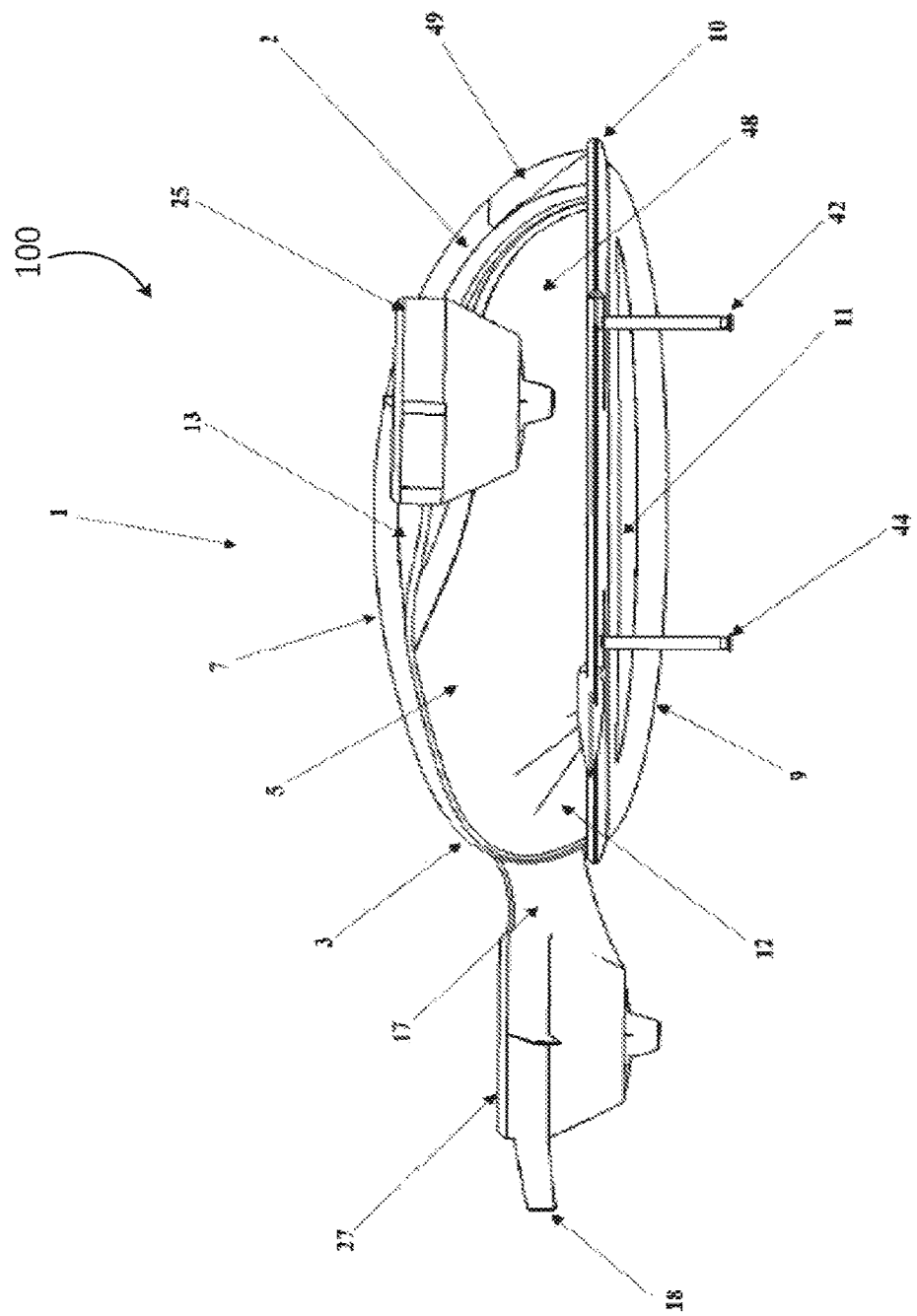
FIG. 4 is a right-side schematic view of a multi-mode aerial vehicle in a VTOL mode according to one embodiment.
Figure 5:
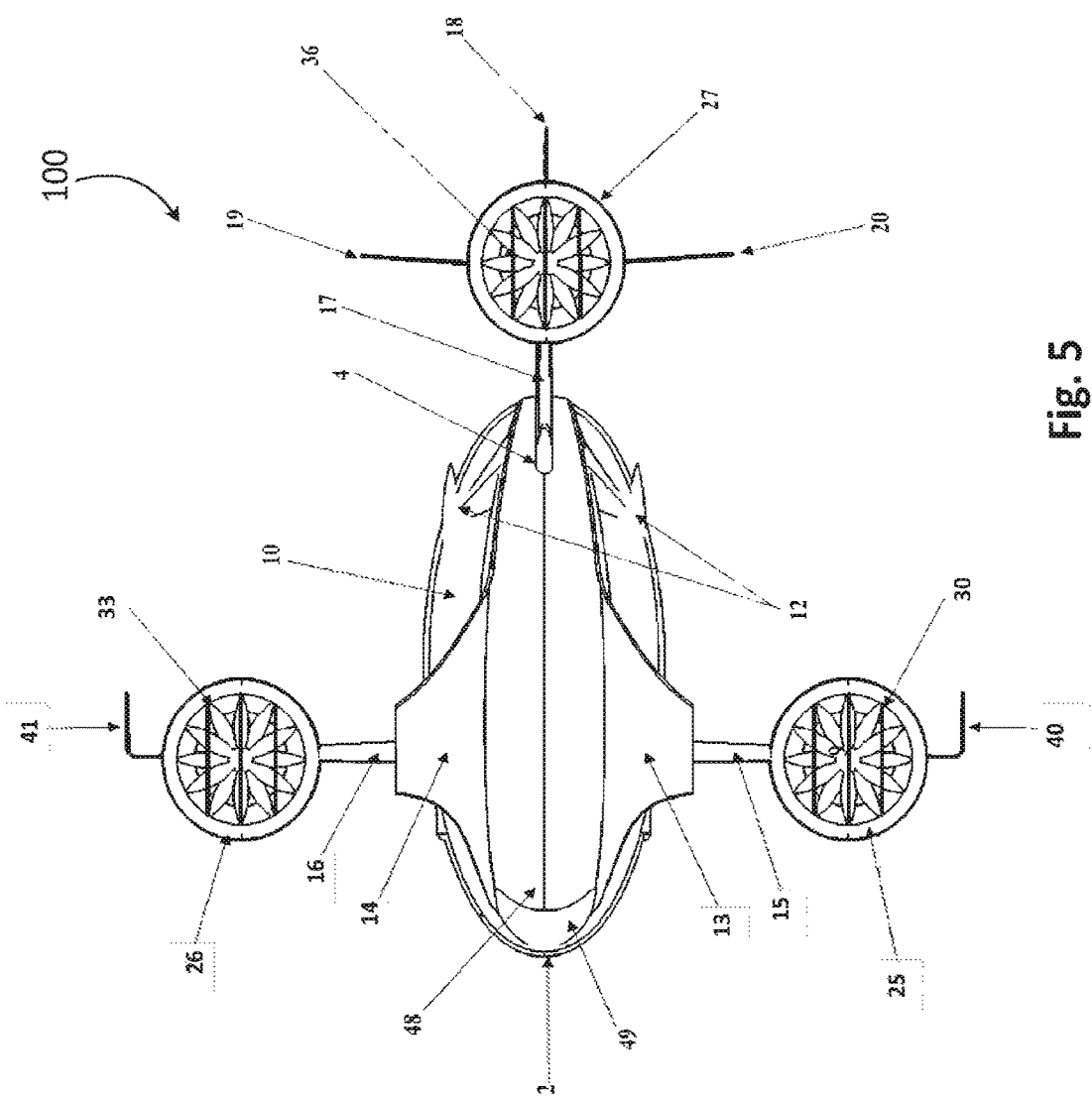
FIG. 5 is a top schematic view of a multi-mode aerial vehicle in a VTOL mode according to one embodiment.
Figure 6:
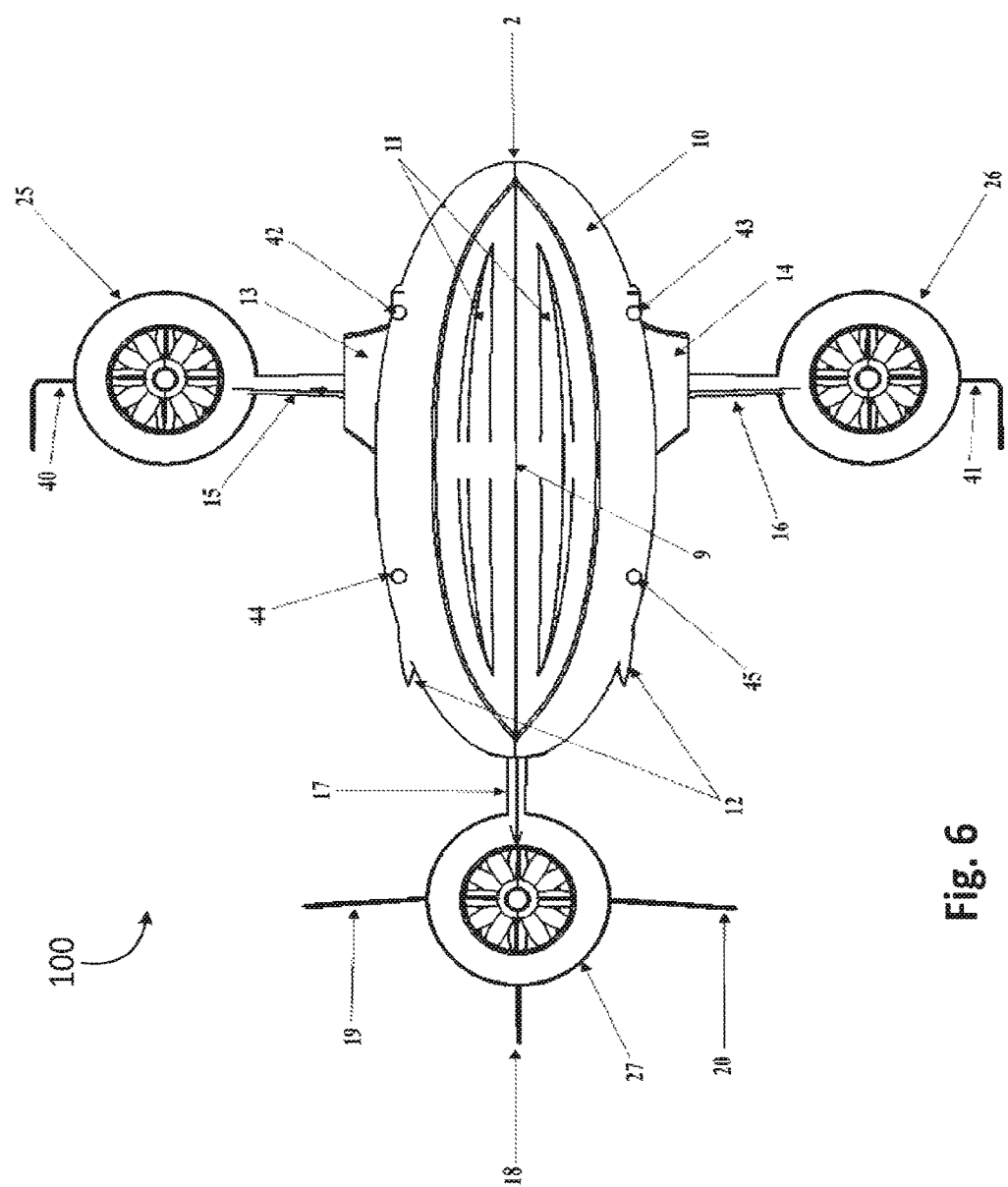
FIG. 6 is a bottom schematic view of a multi-mode aerial vehicle in a VTOL mode according to one embodiment.

FIGS. 1-6 are schematic views of an exemplary multi-mode aerial vehicle 100 in a VTOL mode according to embodiments described herein, Only some of the reference numbers are illustrated in each figure. FIG. 1 is a perspective view of the multi-mode aerial vehicle 100. FIG. 2 is a front view of the multi-mode aerial vehicle 100. FIG. 3 is a left-side view of the multi-mode aerial vehicle 100. FIG. 4 is a right-side view of the multi-mode aerial vehicle 100. FIG. 5 is a top view of the multi-mode aerial vehicle 100. FIG. 6 is a bottom view of the multi-mode aerial vehicle 100.

An elongated fuselage 1 of the multi-mode aerial vehicle 100 has a front end 2, a rear end 3, a curved guide slot 4, two opposite facing sides of a right side 5 and a left side 6, a top end 7, and a flat base 8. A WIG-effect bottom 9 includes a surrounding ring cavity 10, bottom stabilizers 11, and rear stabilizers 12. A windshield 49 is also illustrated at the front end 2.

A right fixed Ogival Delta wing 13 and a left fixed Ogival Delta wing 14 extend from opposite sides of the elongated fuselage 1. An Ogival Delta wing (also referred to as an ogee delta wing) has a smooth-curved surface that joins to the fuselage body. However, other types of fixed wings can be used with embodiments described herein for the right fixed wing 13 and the left fixed wing 14. The right and left fixed Ogival Delta wings 13 and 14 are doubled over their longitudinal axes, wherein the longitudinal axis runs along the length of the wing. A first side of a right small tilt wing 15 is attached to the right fixed Ogival Delta wing 13 at a side opposite to the elongated fuselage 1. A first side of a left small tilt wing 16 is attached to the left fixed Ogival Delta wing 14 at a side opposite to the elongated fuselage 1.

A right diamond-shaped duct 25 is attached to a second side of the right small tilt wing 15, opposite to the right fixed Ogival Delta wing 13. The diamond shape is achieved by varying the top and bottom cross sections of the duct. The diamond shape design provides more thrust, vertical lift, and horizontal speed to the multi-mode aerial vehicle 100. However, the right duct 25 can also be configured in other geometries to achieve the advantages described herein. A right flexible rubber winglet 40 is attached to the right diamond-shaped duct 25, opposite to the right small tilt wing 15. The right flexible rubber winglet 40 is configured to be more aerodynamic in the HTOL mode, and enables multi-mode aerial vehicle 100 to hover in direct contact with an object while in the VTOL mode. The right flexible rubber winglet 40 provides safer operations in confined spaces and in close vicinity to obstructions, residences, and people.

A left diamond-shaped duct 26 is attached to a second side of the left small tilt wing 16, opposite to the left fixed Ogival Delta wing 14. However, the left duct 26 can also be configured in other geometries to achieve the advantages described herein. A left flexible rubber winglet 41 is attached to the left diamond-shaped duct 26, opposite to the left small tilt wing 16. The left flexible rubber winglet 41 is configured to be more aerodynamic in the HTOL mode, and enables multi-mode aerial vehicle 100 to hover in direct contact with an object while in the VTOL mode. The left flexible rubber winglet 41 provides safer operations in confined spaces and in close vicinity to obstructions, residences, and people.

A rear diamond-shaped duct 27 is mounted on a tilt tail 17 at the rear end 3 of the multi-mode aerial vehicle 100. However, the rear duct 27 can also be configured in other geometries to achieve the advantages described herein. The tilt tail 17 is mounted to a vertically-oriented rear shaft, which will be described in more detail herein with reference to FIG. 20.

A vertical stabilizer 18 is located at a far end of the rear diamond-shaped duct 27. A right horizontal stabilizer 19 is located at the right side of the rear diamond-shaped duct 27, and a left horizontal stabilizer 20 is located at the left side of the rear diamond-shaped duct 27.

A right front adjustable and slidable landing gear outer member 42 is illustrated in FIGS. 1, 2, and 4, which will be described in more detail herein with reference to FIG. 26. A left front adjustable and slidable landing gear outer member 43 is illustrated in FIGS. 2 and 3, which will be described in more detail herein with reference to FIG. 26. A right rear adjustable and slidable landing gear outer member 44 is also illustrated in FIGS. 1 and 4, which will be described in more detail herein with reference to FIG. 26. A left rear adjustable and slidable landing gear outer member 45 is illustrated in FIG. 3, which will be described in more detail herein with reference to FIG. 26.

A sliding door 46 is illustrated in FIG. 3. A cockpit 48 is illustrated in FIGS. 3 and 4. An integrated flight control system 50 is illustrated in FIG. 2, which is configured with processing circuitry to control, maneuver, and stabilize the multi-mode aerial vehicle 100. The integrated flight control system 50 will be described in more detail herein with reference to FIGS. 28-30. The placement of integrated flight control system 50 is illustrated as being located near the front upper portion of the cockpit 48. However, other areas within the cockpit 48 or elsewhere within aerial vehicle 100 are contemplated by embodiments described herein.

In a VTOL mode, each of the right diamond-shaped duct 25, the left diamond-shaped duct 26, and the rear diamond-shaped duct 27 is in a horizontal position, relative to the plane of the elongated fuselage 1. The diamond-shaped ducts 25, 26, and 27 are rotated to the horizontal position about their respective right small tilt wing 15, left small tilt wing 16, and the curved guide slot 4. This provides a thrust in a vertical direction from each of the diamond-shaped ducts 25, 26, and 27.

FIG. 5 illustrates three pivotal control surfaces 30 evenly and horizontally positioned at a top entrance of the right diamond-shaped duct 25. FIG. 5 also illustrates three pivotal control surfaces 33 evenly and horizontally positioned at a top entrance of the left diamond-shaped duct 26, three pivotal control surfaces 36 evenly and horizontally positioned at a top entrance of the rear diamond-shaped duct 27. The right, left, and rear pivotal control surfaces 30, 33, and 36 will be described in more detail herein with reference to FIGS. 21, 22, and 23.

Figure 21:
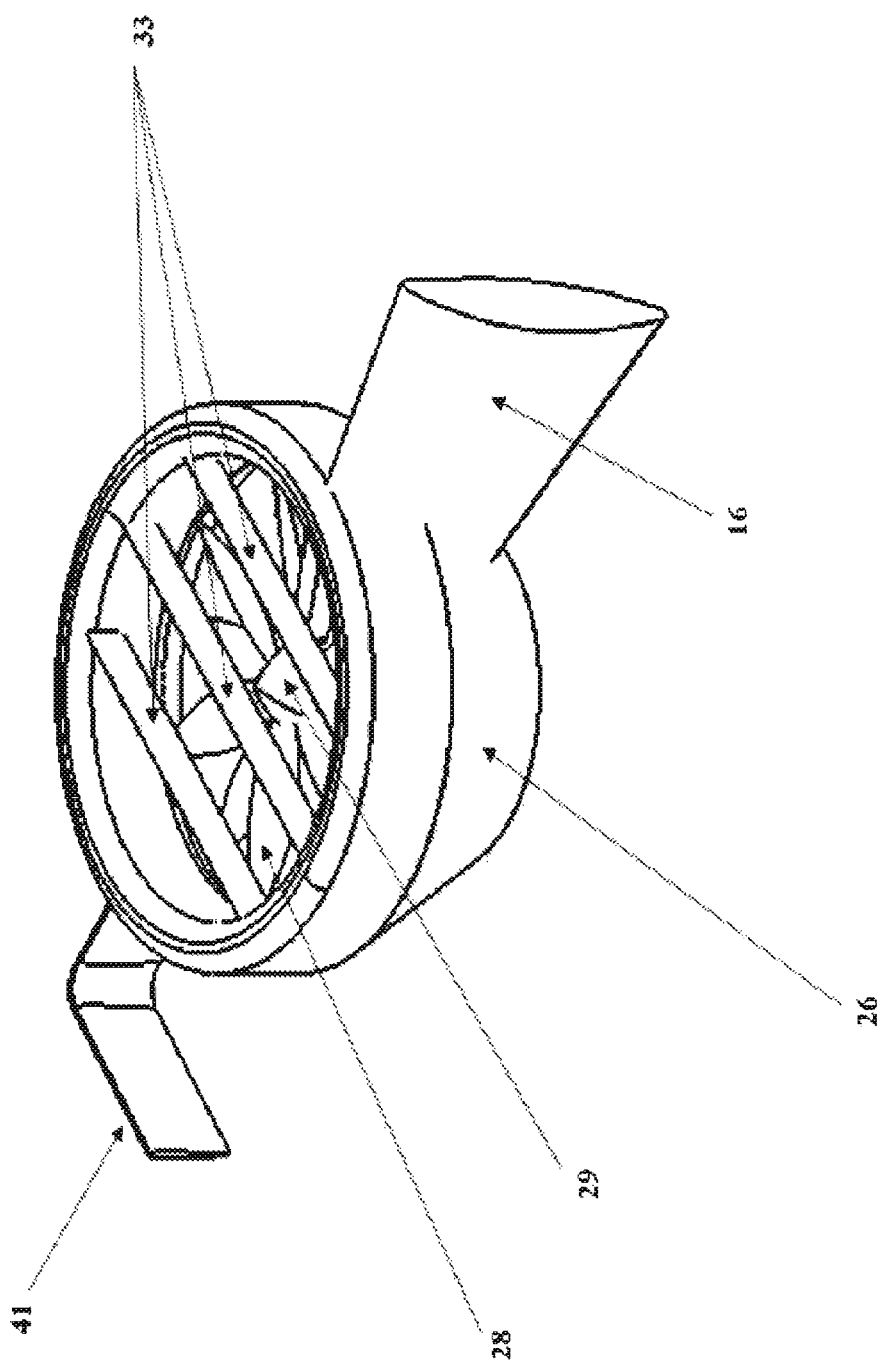
FIG. 21 illustrates left pivotal ducts according to one embodiment.

FIG. 21 illustrates the left diamond-shaped duct 26 which has three pivotal control surfaces 33 evenly and horizontally positioned at a top entrance of the left diamond-shaped duct 26. Dual counter-rotating rotors 28 are located on an underside position relative to the left pivotal control surfaces 33. An engine 29 is located centrally within the left diamond-shaped duct 26. The right diamond-shaped duct 25 is similarly arranged with corresponding similar components. Likewise, the rear diamond-shaped duct 27 is similarly arranged with corresponding similar components.

Figure 22:
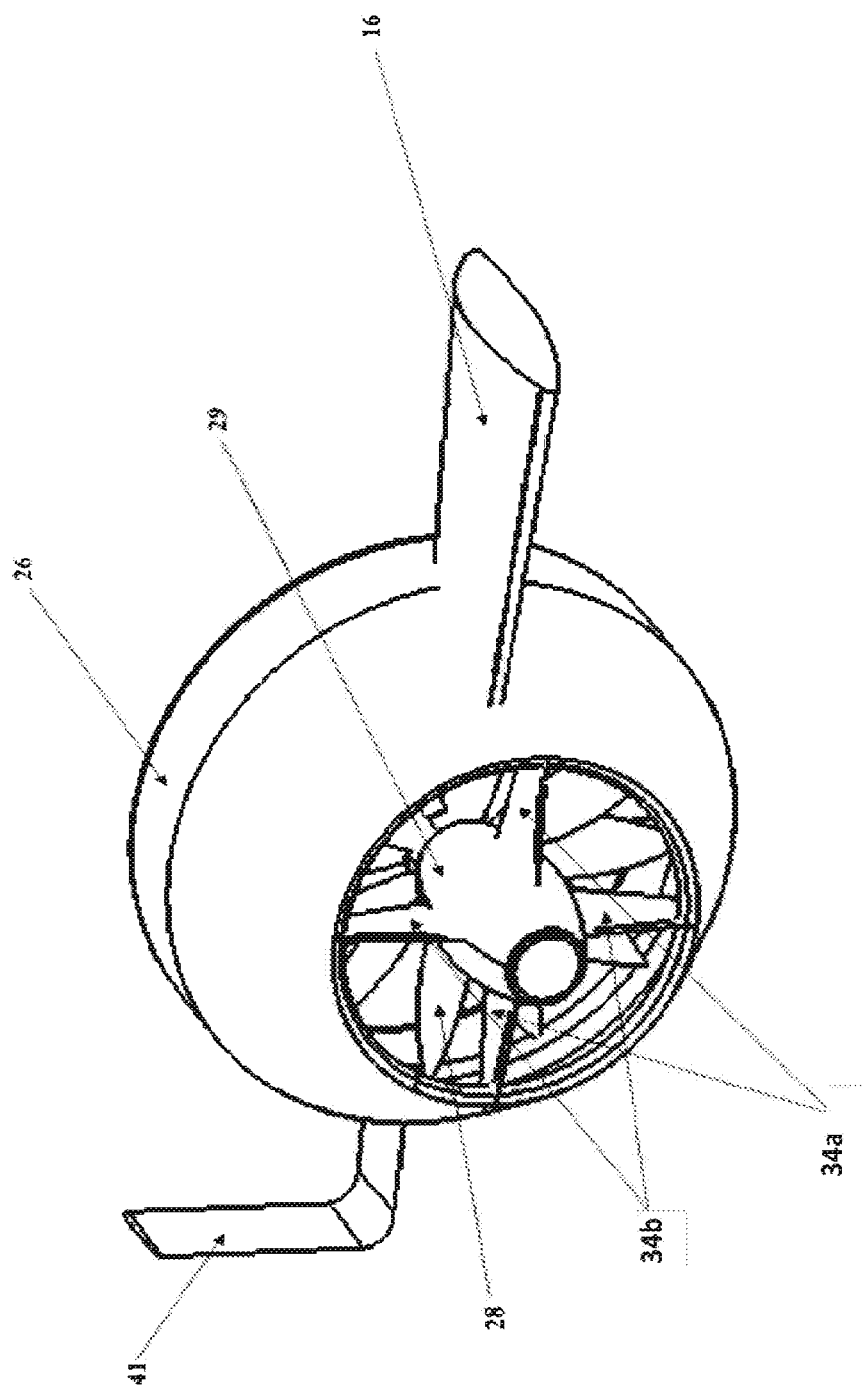
FIG. 22 illustrates a left diamond-shaped duct according to one embodiment.

FIG. 22 illustrates an opposite view of the left diamond-shaped duct 26, relative to FIG. 21. Left duct vertically-positioned cross stators 34b are located on the back entrance of the left diamond-shaped duct 26, along with left duct horizontally-positioned cross stators 34a. FIG. 22 illustrates two left duct vertically-positioned cross stators 34b and two left duct horizontally-positioned cross stators 34a. However, more than two of either or both left duct cross stators are contemplated by embodiments described herein. The right diamond-shaped duct 25 is similarly arranged with corresponding right duct vertically-positioned cross stators and right duct horizontally-positioned cross stators. Likewise, the rear diamond-shaped duct 27 is similarly arranged with corresponding rear duct vertically-positioned cross stators and rear duct horizontally-positioned cross stators.

Figure 23:
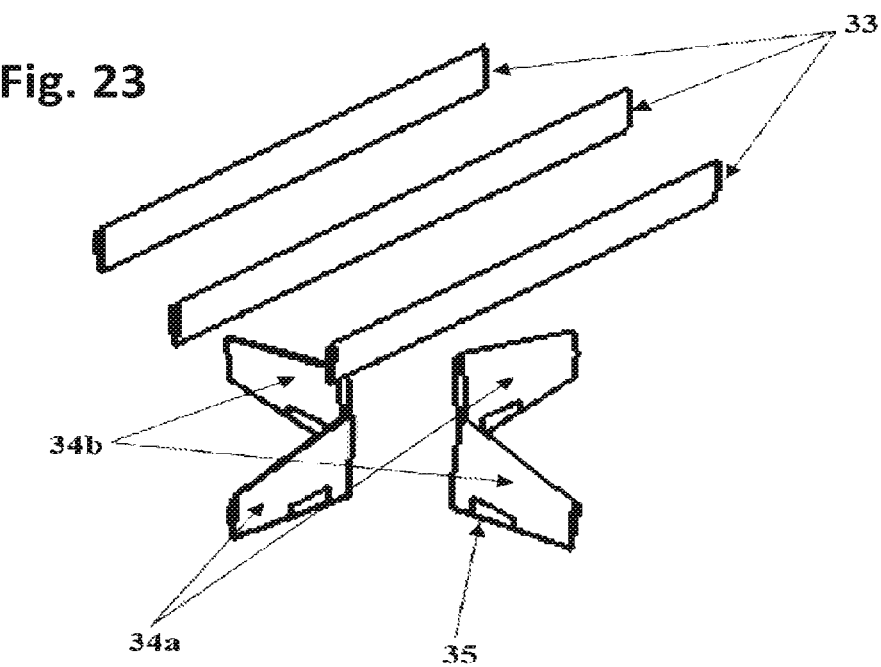
FIG. 23 illustrates a detail of left pivotal ducts according to one embodiment.

FIG. 23 illustrates the left pivotal control surfaces 33, along with the left duct vertically-positioned stators 34b and the left duct horizontally-positioned stators 34a in more detail. FIG. 23 also illustrates left duct stator pivotal control surfaces 35 in each of the left duct cross stators 34a and 34b. The left duct stator pivotal control surfaces 35 are configured to rectify turbulent flow and reduce swirl velocity. The three pivotal control surfaces 30 are similarly arranged in which the right duct vertically-positioned cross stators and the right duct horizontally-positioned cross stators have right duct stator pivotal control surfaces. Likewise, the rear pivotal control surfaces 36 are similarly arranged in which the rear duct vertically-positioned stators and the rear duct horizontally-positioned stators have rear duct stator pivotal control surfaces.

The right diamond-shaped duct 25, the left diamond-shaped duct 26, and the rear diamond-shaped duct 27 are configured to develop more thrust, vertical lift, and forward horizontal speed. The dual counter-rotating rotors 28 mounted to the engine 29 are configured to ensure the multi-mode aerial vehicle 100 is hovering without having a spinning torque, such as a co-axial helicopter.

For aerodynamic performance, the diamond shape of the ducts 25, 26, and 27 is based on varying the top and bottom cross sections of the diamond-shaped ducts 25, 26, and 27 to take advantage of the velocity and the pressure of airflow, according to Bernoulli's Principle. The layout of the diamond-shaped ducts 25, 26, and 27 provides more thrust, vertical lift, and forward horizontal speed. The right and left fixed Ogival Delta wings 13 and 14 are configured to provide most of the lifting force, particularly during HTOL flight. The overall layout of the fuselage 1, the fixed Ogival Delta wings 13 and 14, and the WIG-effect bottom 9 provides a high aerodynamic performance. Ultra-light weighted structures also provide an efficient and reliable multi-mode aerial vehicle 100.

Stability of multi-mode aerial vehicle 100 is achieved by employing dual counter-rotating rotors 28, which cause the torque produced from each rotor to cancel out and provide better gyroscopic stability, more power, and more propeller efficiency. In addition, the overall layout of the fuselage 1, the Ogival Delta wings 13 and 14, and the WIG-effect bottom 9 provides a high degree of stability.

Controllability of multi-mode aerial vehicle 100 is maintained by varying and vectoring the thrust produced by all three engines 29, using the pivotal control surfaces 30, 33, and 36 at the top entrances of the diamond-shaped ducts 25, 26, and 27, respectively. Each set of the pivotal control surfaces 30, 33, and 36 direct and re-direct the flow of air entering each diamond-shaped duct 25, 26, and 27. Controllability is provided by the integrated flight control system 50, which will be described in more detail herein with reference to FIGS. 28-30.

Pitch control can be accomplished by tilting the small tilt-wings 15 and 16 and the tilt tail 17 collectively, which allows the diamond-shaped ducts 25, 26, and 27 to tilt to a change in the direction of the air flow. Pitch control can also be accomplished by tilting collectively the small tilt-wings 15 and 16, the tilt tail 17, and the pivotal control surfaces 30, 33, and 36.

Yaw and roll control can be accomplished by keeping one of the small tilt-wings 15 or 16 and the tilt tail 17 stationery, while tilting the other small tilt-wing 16 or 15 differentially. Yaw and roll control can also be accomplished by rotating the pivotal control surfaces 30 and 36 at the top entrance of the right front diamond-shaped duct 25 and the rear diamond-shaped duct 27, or by rotating the pivotal control surfaces 33 and 36 of the left front diamond-shaped duct 26 and the rear diamond-shaped duct 27 individually, while not rotating the pivotal control surfaces in the other front duct, to reduce deflected air flow around them.

Maneuverability of multi-mode aerial vehicle 100 can be maintained by rotating each set of pivotal control surfaces 30, 33, and 36 individually, using the integrated flight control system 50, by different angles to rectify the turbulent air flow, which reduces the swirl velocity. This ensures the air flow will vary from one diamond-shaped duct to another diamond-shaped duct.

Figure 7:
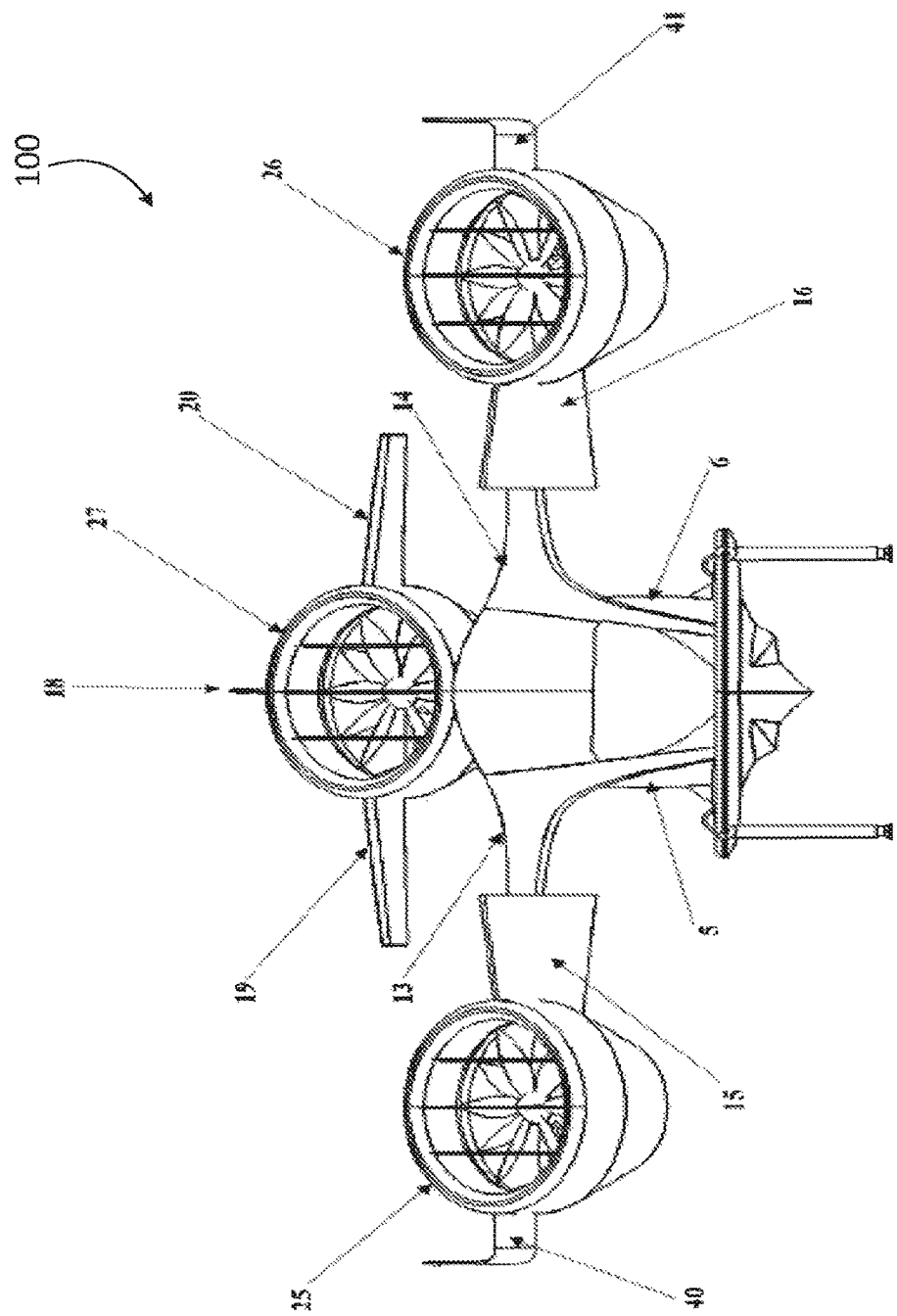
FIG. 7 is a front schematic view of a multi-mode aerial vehicle in a short take-off and landing (STOL) mode according to one embodiment.
Figure 8:
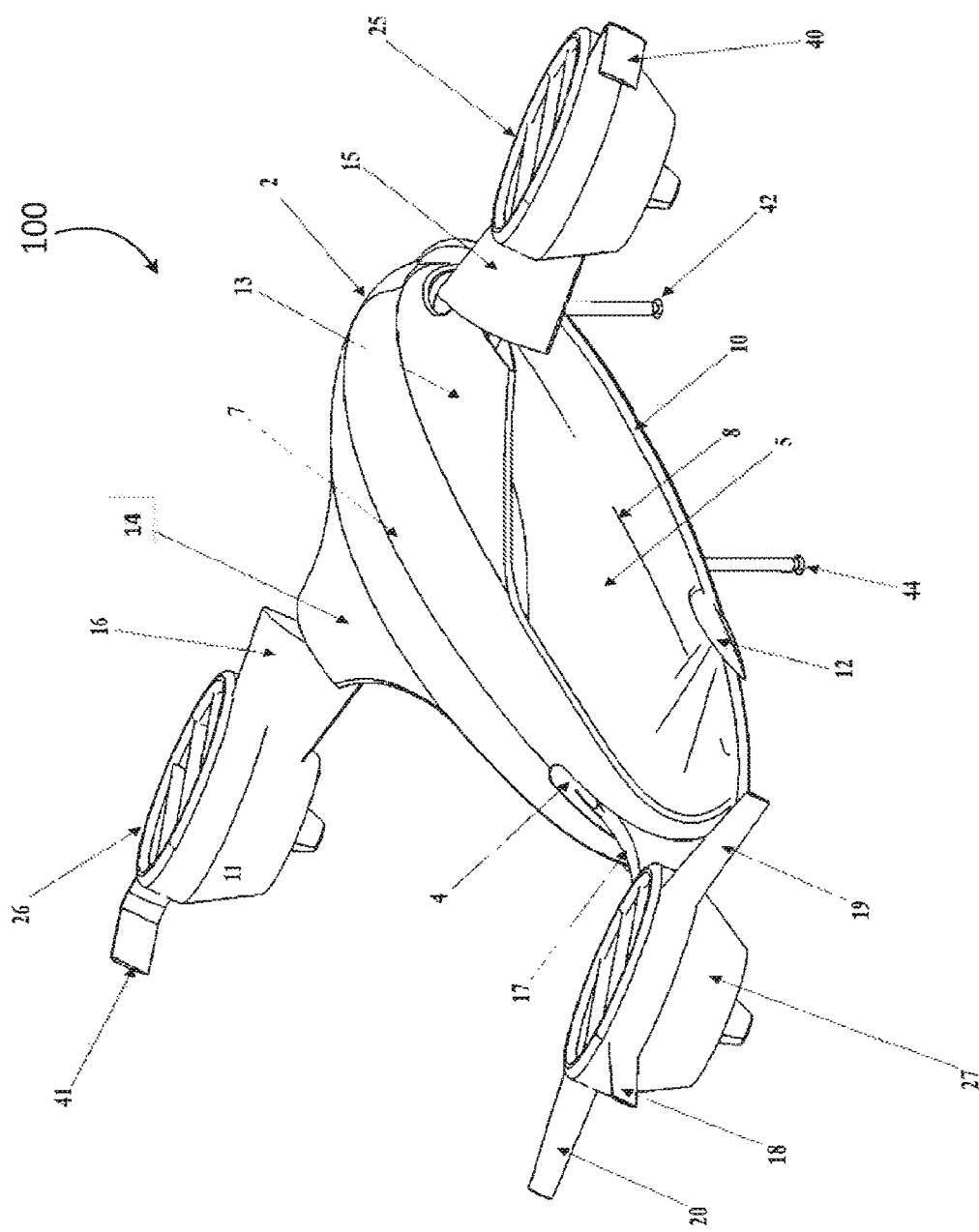
FIG. 8 is a perspective schematic view of a multi-mode aerial vehicle in a STOL mode according to one embodiment.
Figure 9:
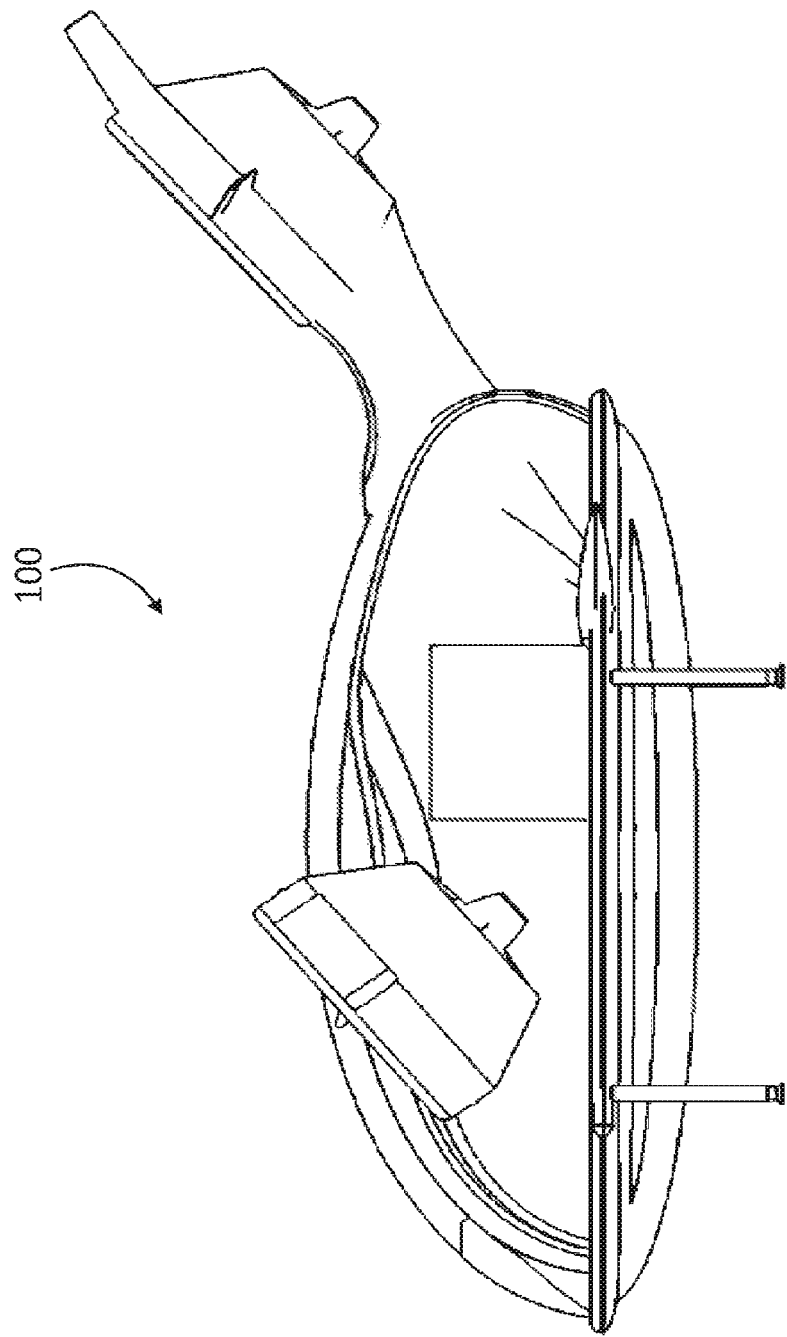
FIG. 9 is a left-side schematic view of a multi-mode aerial vehicle in a STOL mode according to one embodiment.
Figure 10:
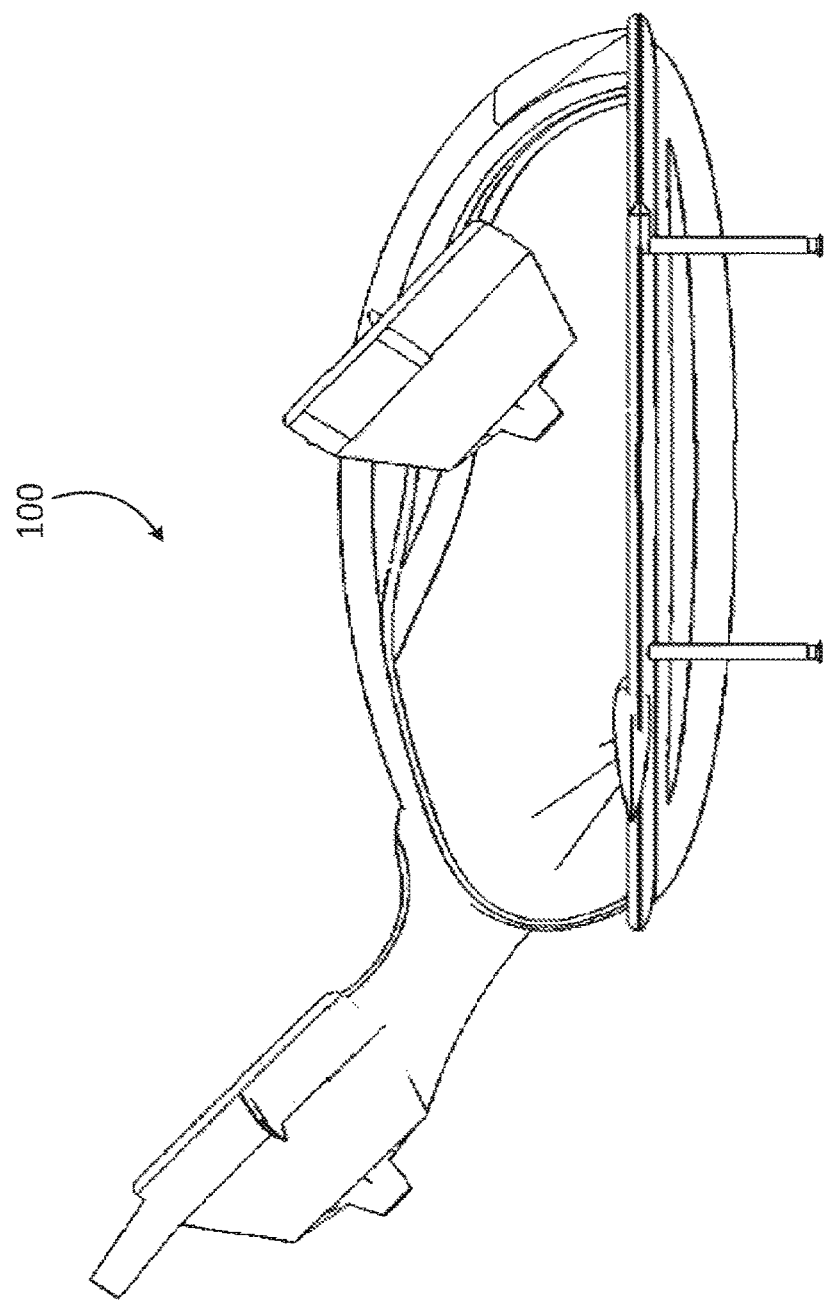
FIG. 10 is a right-side schematic view of a multi-mode aerial vehicle in a STOL mode according to one embodiment.
Figure 11:
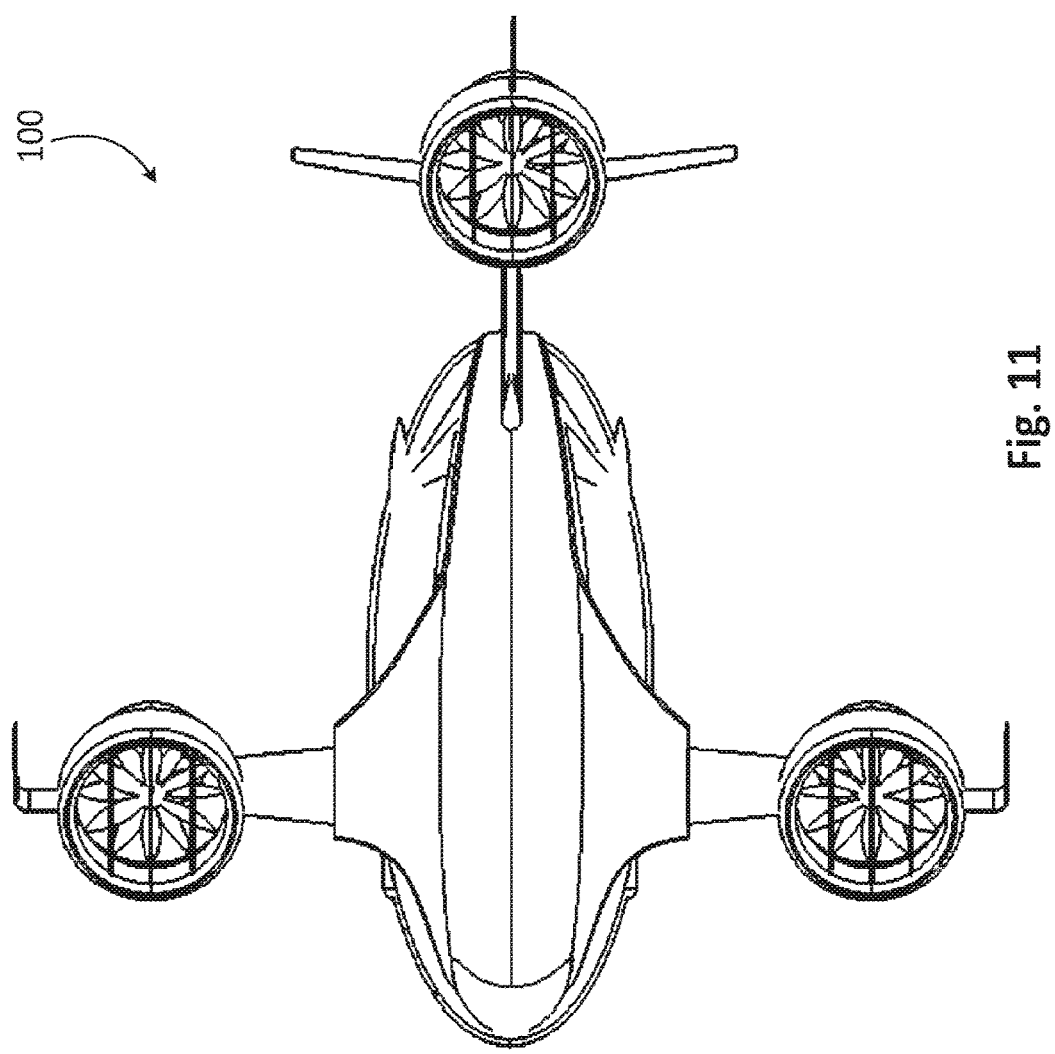
FIG. 11 is a top schematic view of a multi-mode aerial vehicle in a STOL mode according to one embodiment.
Figure 12:
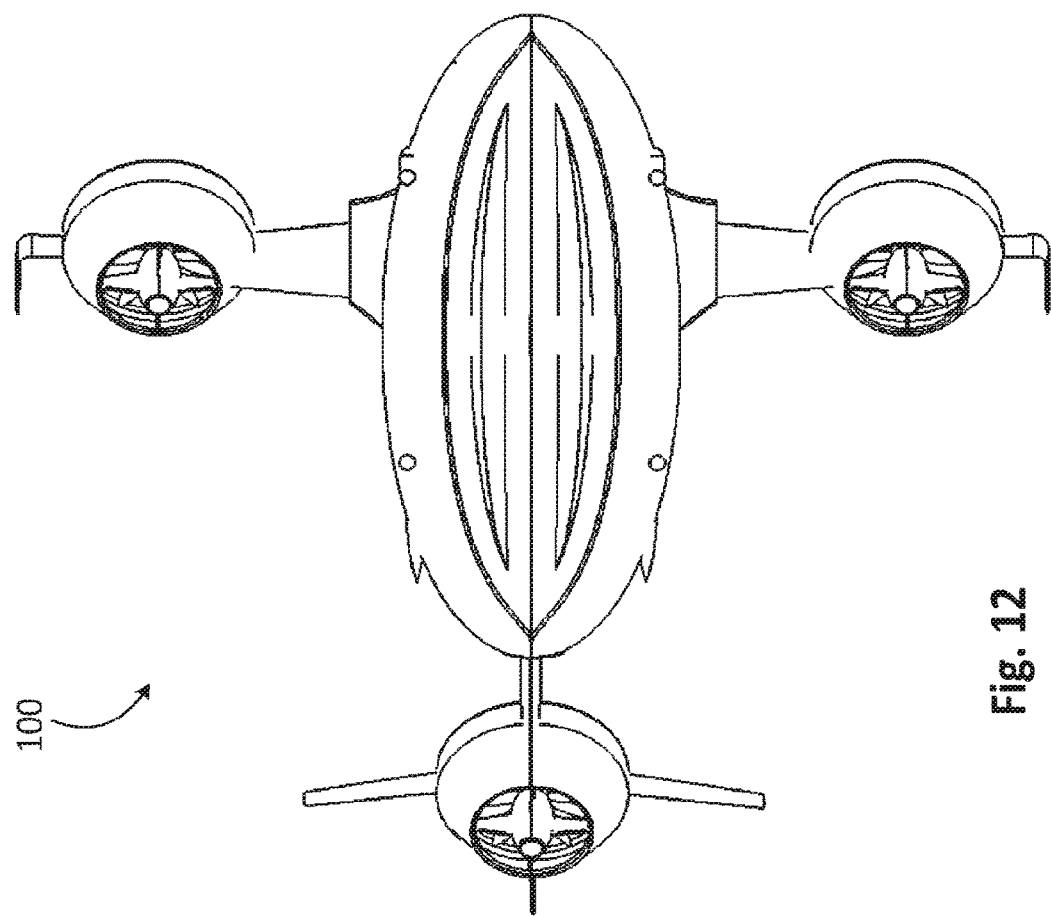
FIG. 12 is a bottom schematic view of a multi-mode aerial vehicle in a STOL mode according to one embodiment.

FIGS. 7-12 are schematic views of an exemplary multi-mode aerial vehicle 100 in a STOL mode according to embodiments described herein. Only some of the reference numbers are illustrated in some of the figures. FIG. 7 is a front view of multi-mode aerial vehicle 100. FIG. 8 is a perspective view of multi-mode aerial vehicle 100. FIG. 9 is a left-side view of multi-mode aerial vehicle 100. FIG. 10 is a right-side view of multi-mode aerial vehicle 100. FIG. 11 is a top view of multi-mode aerial vehicle 100. FIG. 12 is a bottom view of multi-mode aerial vehicle 100.

As illustrated, each of the right diamond-shaped duct 25, the left diamond-shaped duct 26, and the rear diamond-shaped duct 27 are rotated slightly upwards from the horizontal position, relative to the plane of the elongated fuselage 1. In one embodiment, each of the diamond-shaped ducts 25, 26, and 27 are rotated upwards from a horizontal plane 30-45 degrees. However, other angles of rotation are contemplated by embodiments described herein, and will depend upon the pre-determined travel route and conditions. This provides a thrust in both the vertical and horizontal positions from each of the diamond-shaped ducts 25, 26, and 27.

Figure 13:
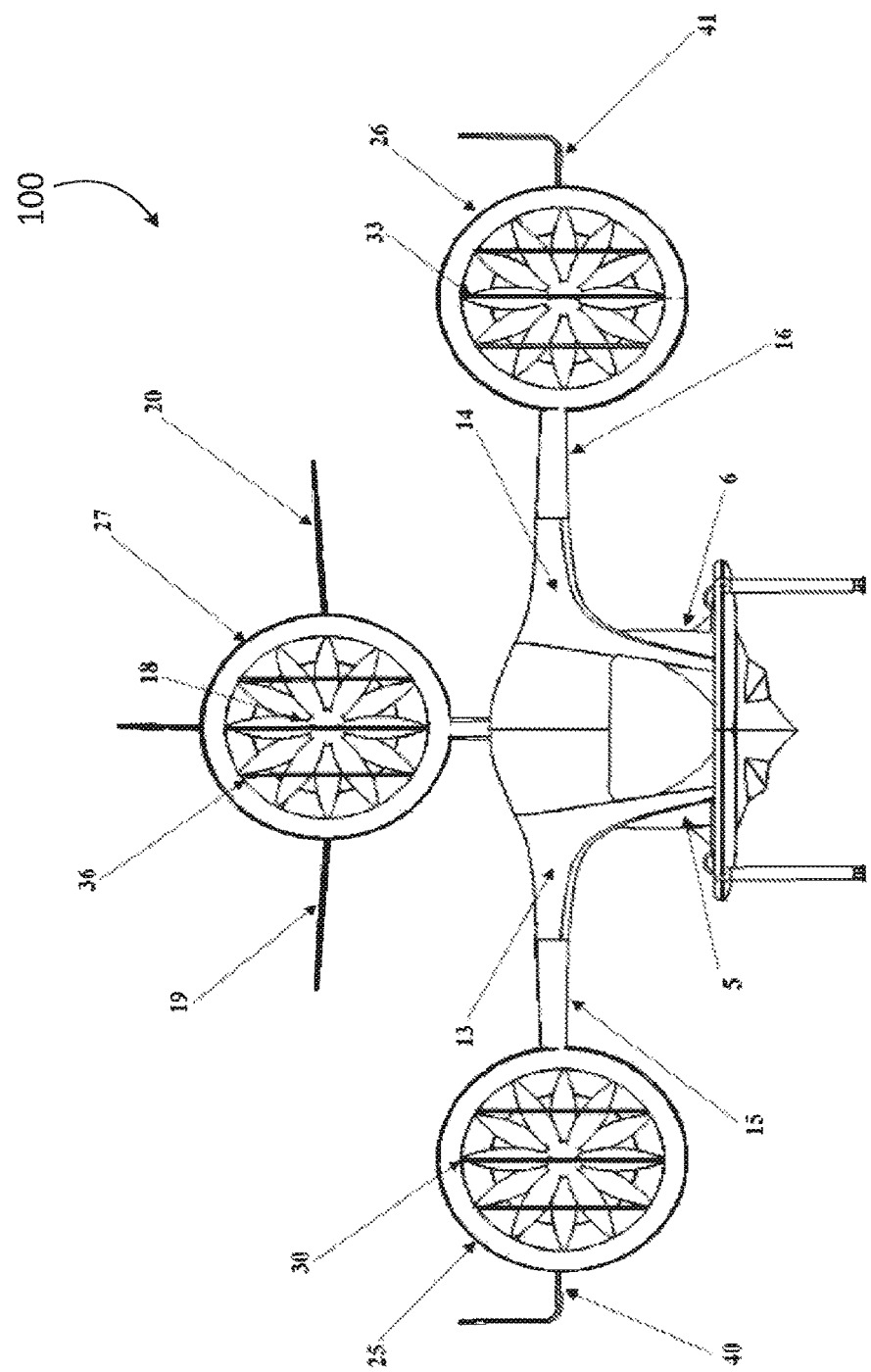
FIG. 13 is a front schematic view of a multi-mode aerial vehicle in a horizontal take-off and landing (HTOL) mode according to one embodiment.
Figure 14:
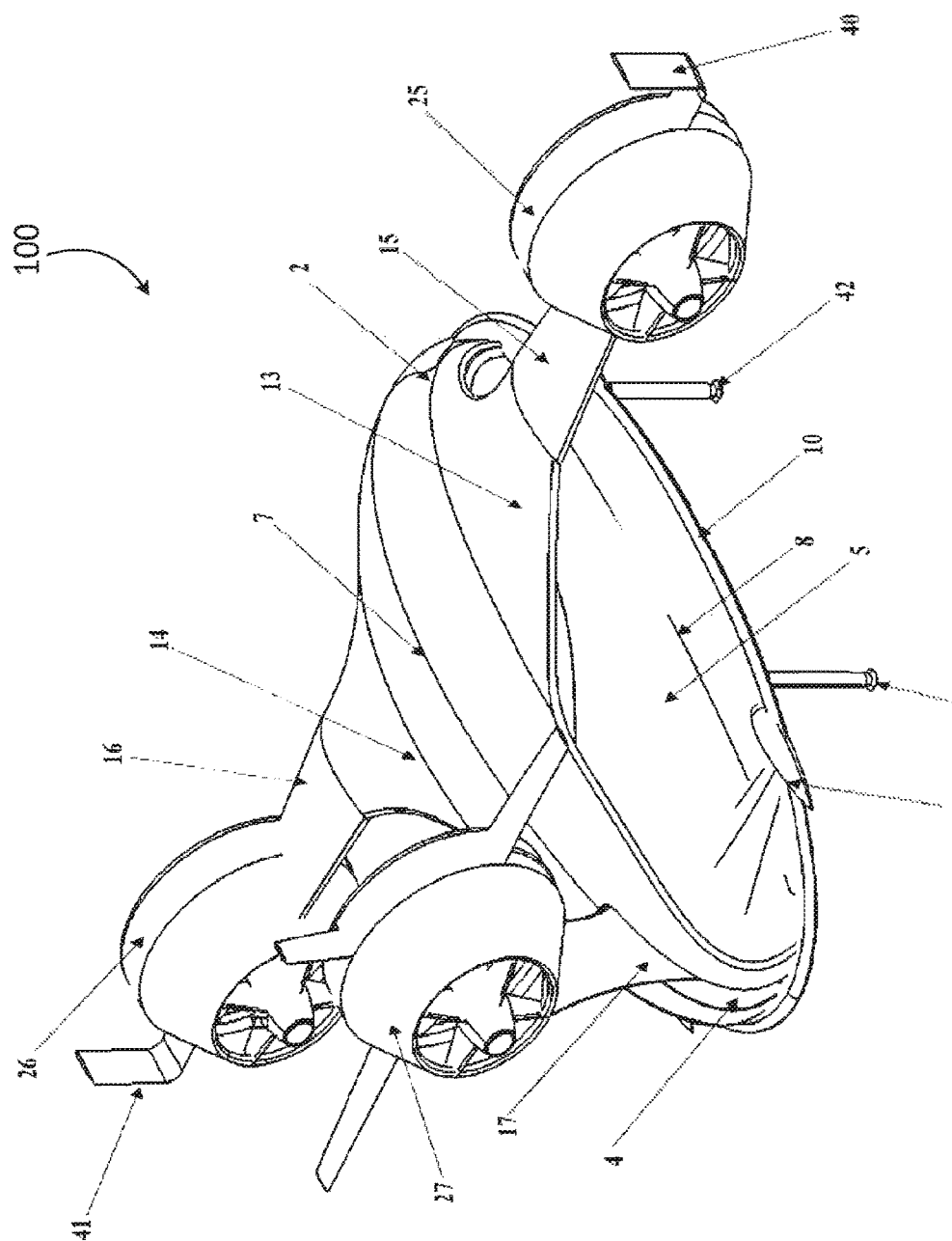
FIG. 14 is a perspective schematic view of a multi-mode aerial vehicle in a HTOL mode according to one embodiment.
Figure 15:
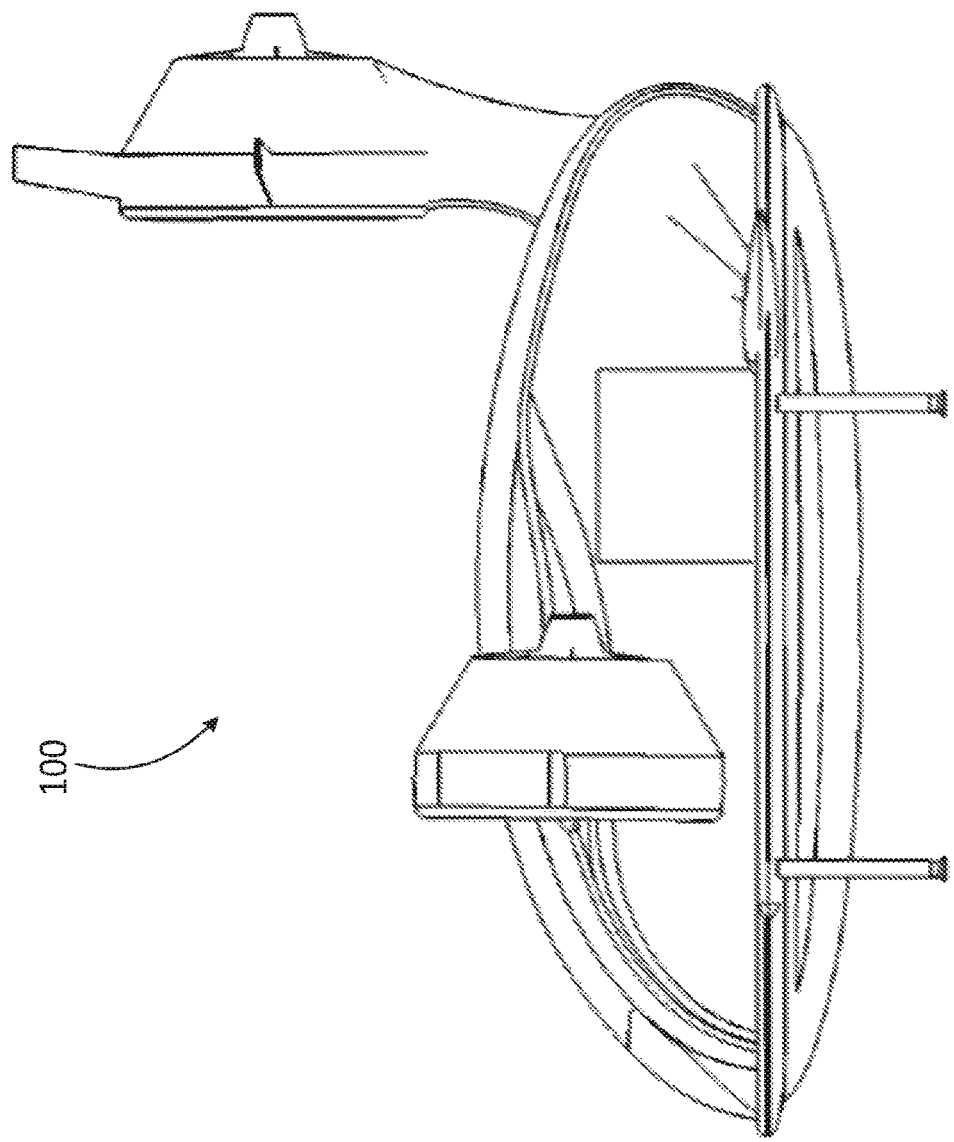
FIG. 15 is a left-side schematic view of a multi-mode aerial vehicle in a HTOL mode according to one embodiment.
Figure 16:
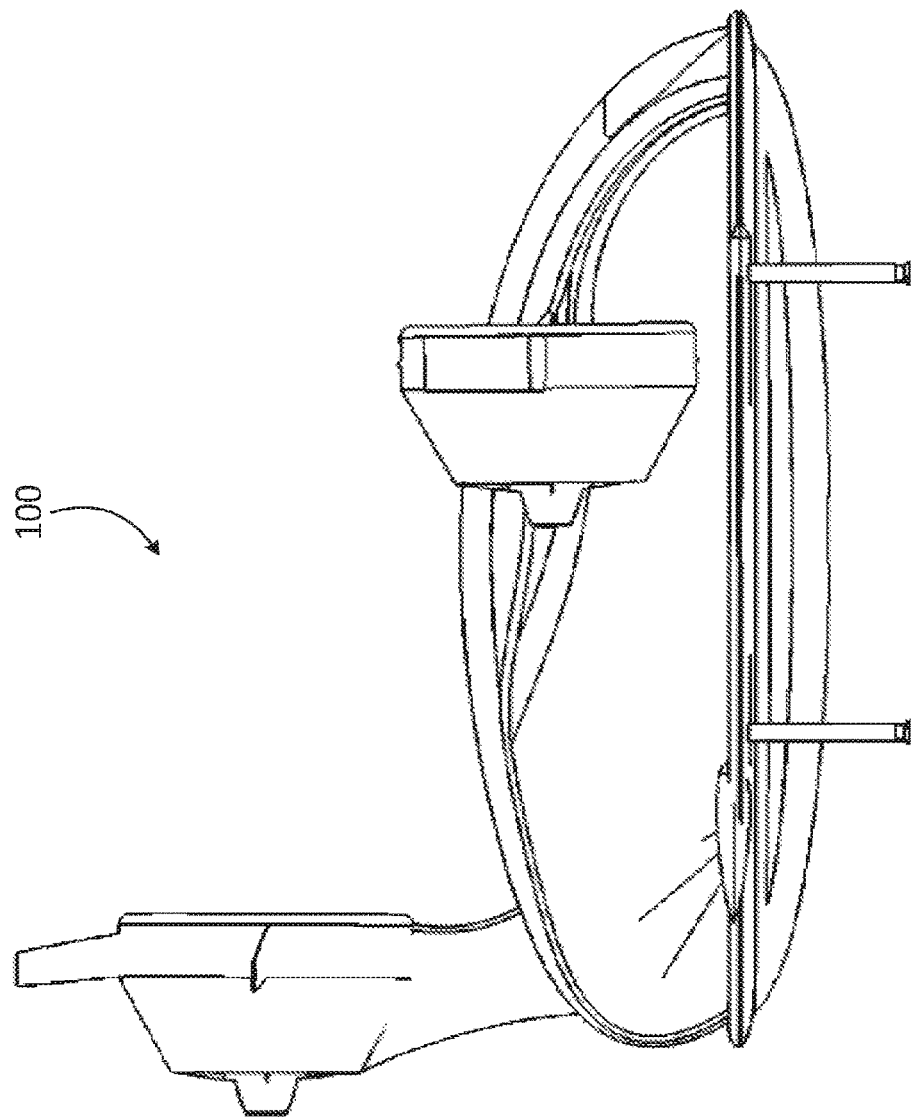
FIG. 16 is a right-side schematic view of a multi-mode aerial vehicle in a HTOL mode according to one embodiment.
Figure 17:
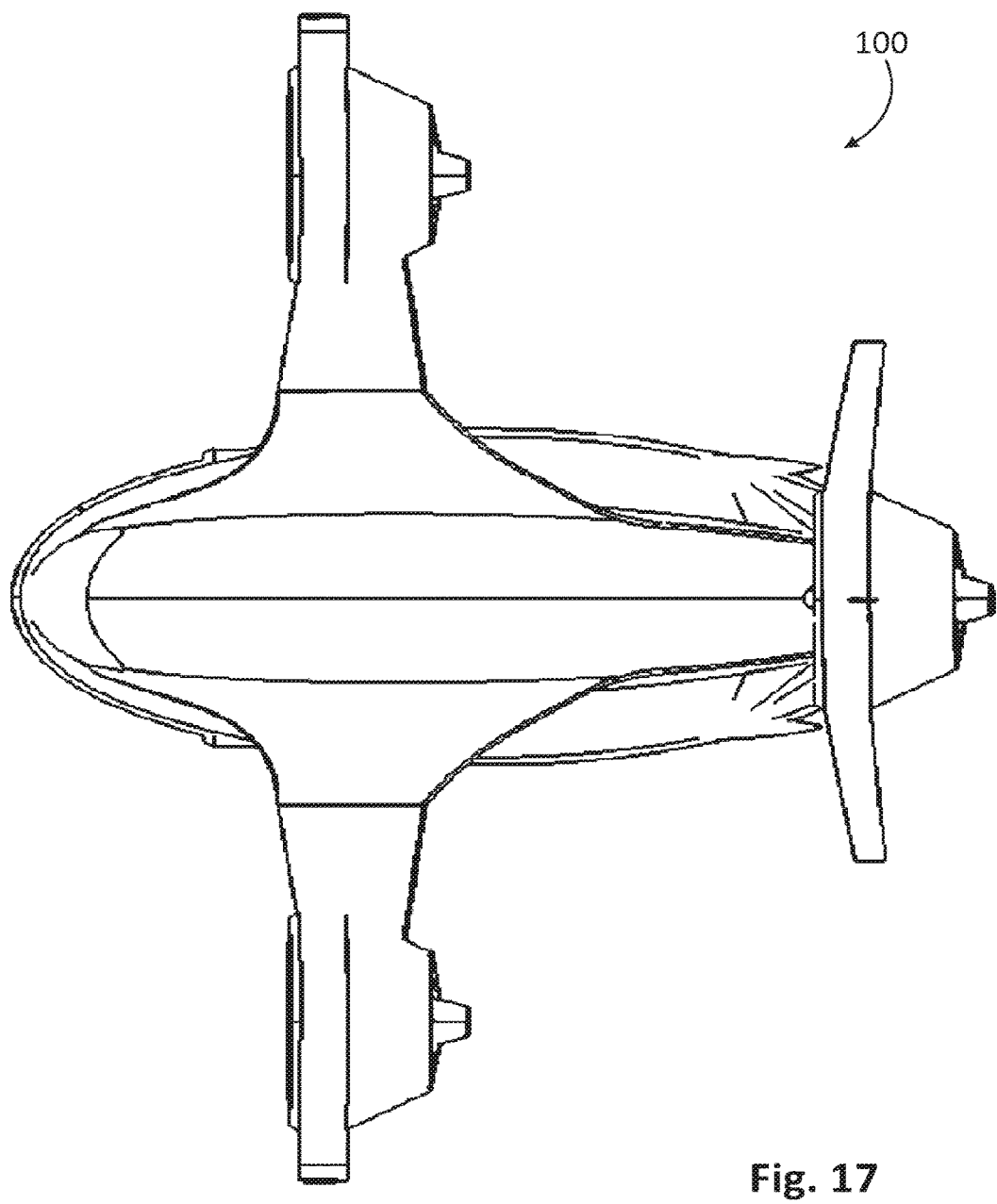
FIG. 17 is a top schematic view of a multi-mode aerial vehicle in a HTOL mode according to one embodiment.
Figure 18:
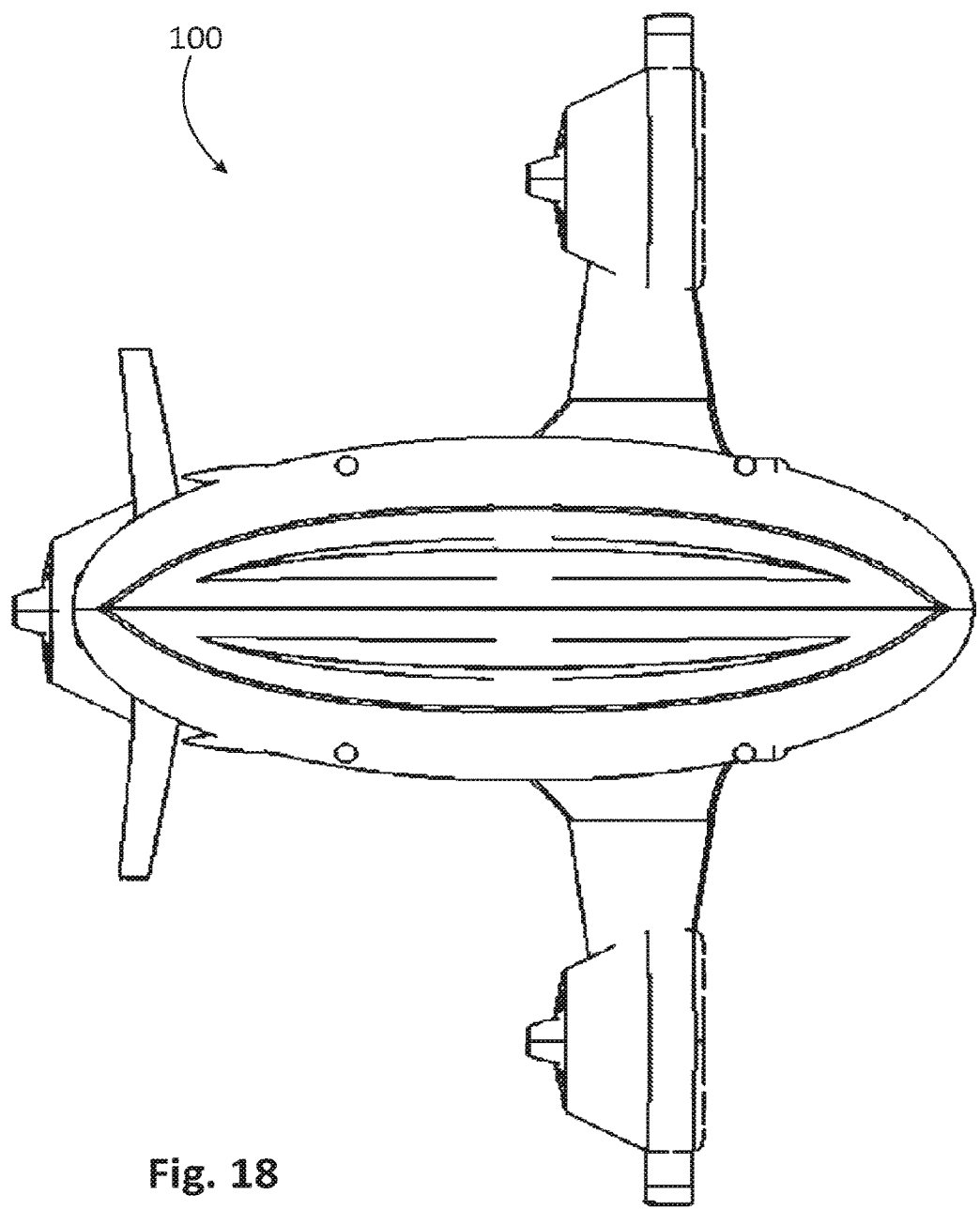
FIG. 18 is a bottom schematic view of a multi-mode aerial vehicle in a HTOL mode according to one embodiment.

FIGS. 13-18 are schematic views of an exemplary multi-mode aerial vehicle 100 in a HTOL mode according to embodiments described herein. Only some of the reference numbers are illustrated in some of the figures. FIG. 13 is a front view of multi-mode aerial vehicle 100. FIG. 14 is a perspective view of multi-mode aerial vehicle 100. FIG. 15 is a left-side view of multi-mode aerial vehicle 100. FIG. 16 is a right-side view of multi-mode aerial vehicle 100. FIG. 17 is a top view of multi-mode aerial vehicle 100. FIG. 18 is a bottom view of multi-mode aerial vehicle 100.

As illustrated in FIGS. 13-18, each of the right diamond-shaped duct 25, the left diamond-shaped duct 26, and the rear diamond-shaped duct 27 are rotated upwards from a horizontal plane at or near to ninety degrees in an HTOL mode. This provides a complete or nearly complete thrust in the horizontal direction from each of the diamond-shaped ducts 25, 26, and 27.

Figure 19A:
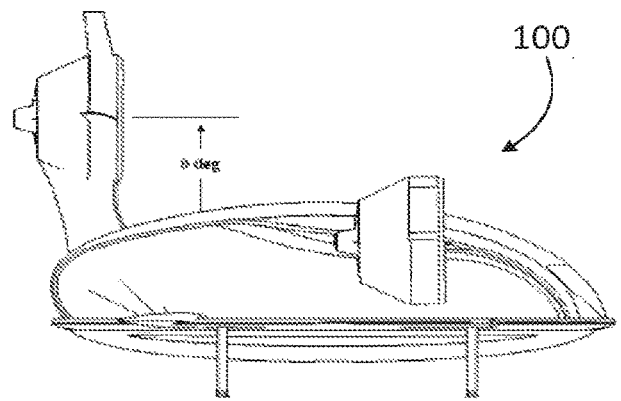
FIG. 19a is a side schematic view of a multi-mode aerial vehicle in a HTOL mode according to one embodiment.

FIG. 19*a* is a schematic side view of multi-mode aerial vehicle 100 with each of the right diamond-shaped duct 25, the left diamond-shaped duct 26, and the rear diamond-shaped duct 27 oriented at zero degrees, relative to a vertical plane, in a HTOL mode. This provides a complete or nearly complete thrust in the horizontal direction from each of the diamond-shaped ducts 25, 26, and 27.

Figure 19B:
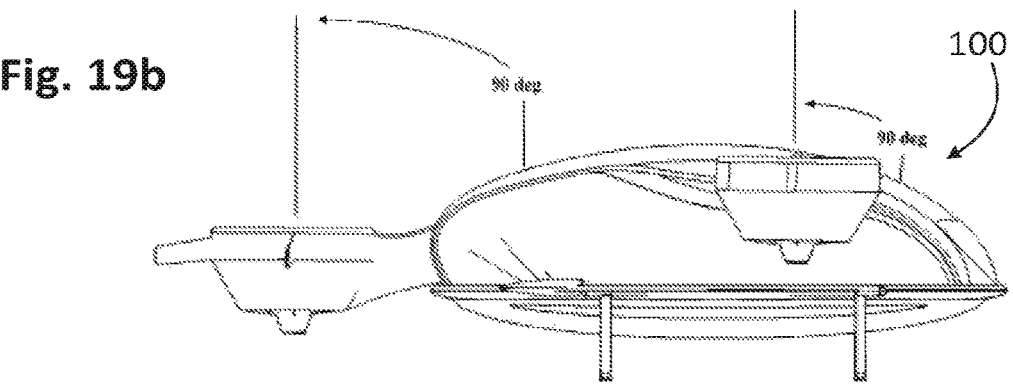
FIG. 19b is a side schematic view of a multi-mode aerial vehicle in a STOL mode according to one embodiment.

FIG. 19*b* is a schematic side view of multi-mode aerial vehicle 100 with each of the diamond-shaped ducts 25, 26, and 27 oriented in a horizontal ninety-degree position, relative to a vertical plane in a VTOL mode. This provides a complete or nearly complete thrust in the vertical direction from each of the diamond-shaped ducts 25, 26, and 27. When multi-mode aerial vehicle 100 transitions from a HTOL mode to a VTOL mode and the diamond-shaped ducts 25, 26, and 27 are rotated ninety degrees backward, multi-mode aerial vehicle 100 is slowed to a complete stop of a forward motion and into a hovering mode.

Figure 19C:
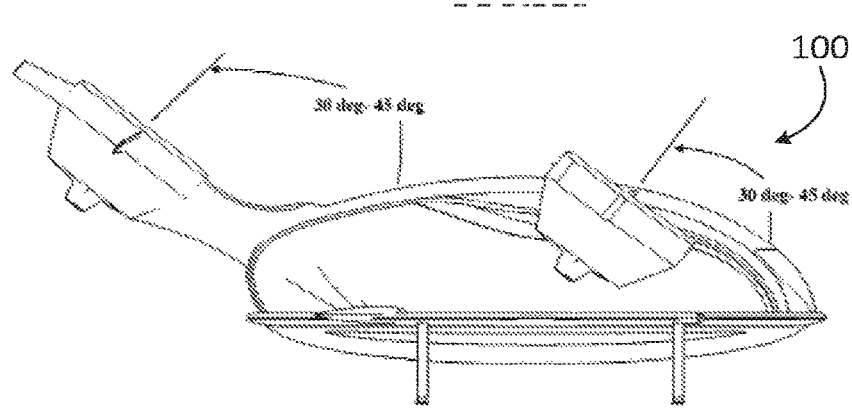
FIG. 19c is a side schematic view of a multi-mode aerial vehicle in a VTOL mode according to one embodiment.

FIG. 19*c* is a schematic side view of multi-mode aerial vehicle 100 with each of the diamond-shaped ducts 25, 26, and 27 oriented at or near a 30-45 degree position, relative to a vertical plane in a STOL mode. The STOL mode is considered to be an air-breaking mode. When the diamond-shaped ducts 25, 26, and 27 are rotated backward to a 30-45 degree position, it slows a forward motion of aerial vehicle 100. This decreases the air speed when air flow hits the tilt-wing surfaces. When the diamond-shaped ducts 25, 26, and 27 are rotated upward to the 30-45 degree position, the vertical thrust is increased while in the STOL mode.

FIG. 20 is a schematic perspective view, illustrating a tilting mechanism. The outline of aerial vehicle 100 is illustrated with dashed lines to indicate the noted features are located out of view from the external surface of aerial vehicle 100.

The tilting mechanism includes a gearbox 21 mounted on the flat base 8 of the elongated fuselage 1. The tilting mechanism connects a right horizontally-oriented shaft 22 and a left horizontally-oriented shaft 23, which are integrated within respective right and left small tilt wings 16 and 15. The gearbox 21 is also coupled to a vertically-oriented rear shaft 24, which is integrated with the tilt tail 17.

Figure 24:
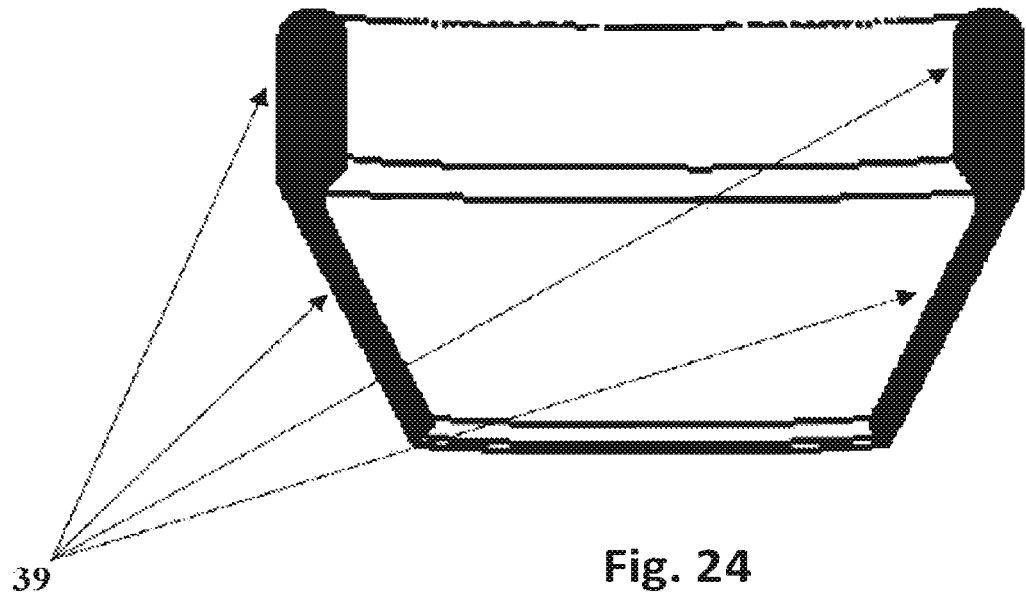
FIG. 24 illustrates a noise-blocking and insulation material according to one embodiment.

FIG. 24 illustrates a noise-blocking and insulation material 39, which is integrated within the duct walls of the right diamond-shaped duct 25, the left diamond-shaped duct 26, and the rear diamond-shaped duct 27. This provides an optimization of reduced noise levels while operating inside urban environments.

Figure 25:
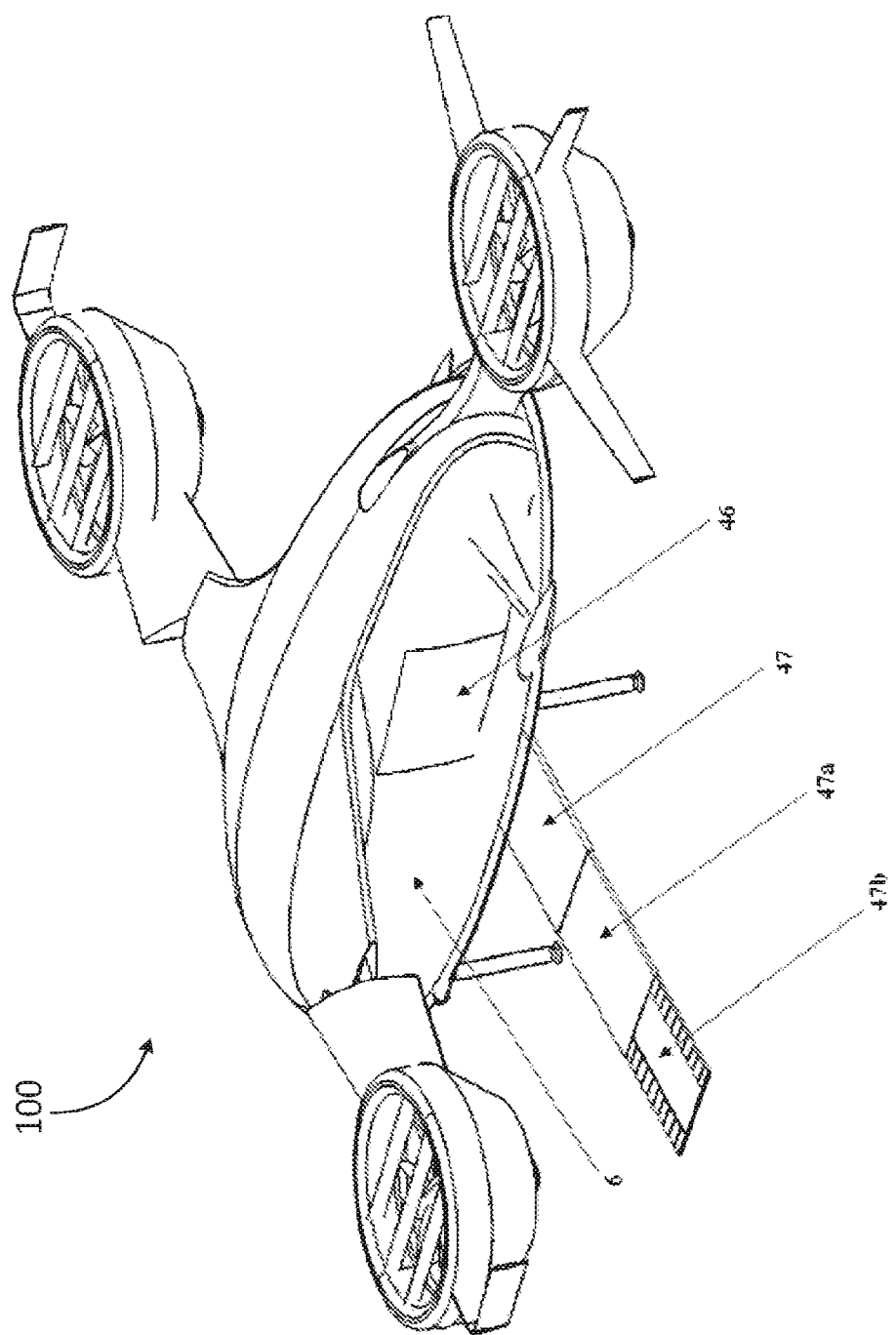
FIG. 25 illustrates a perspective view of a hydraulically-extendable bridge assembly according to one embodiment.

FIG. 25 illustrates a perspective view of multi-mode aerial vehicle 100 and the hydraulically-extendable bridge assembly 47. When activated, the hydraulically-extendable bridge assembly 47 is extended from the WIG-effect bottom 9 of multi-mode aerial vehicle 100, or it can be extended from an area between the interior cabin floor and the bottom surface of multi-mode aerial vehicle 100. The hydraulically-extendable bridge assembly 47 is further extended to include a first inner bridge member 47a, which slides within an outer bridge receptacle member. The hydraulically-extendable bridge assembly 47 also includes a second inner bridge member 47b, which slides with the first inner bridge member 47a. Counter weights are provided within a bottom area of multi-mode aerial vehicle 100, so that the multi-mode aerial vehicle 100 remains balanced when a load is applied to the hydraulically-extendable bridge assembly 47.

In the fully extended position, the hydraulically-extendable bridge assembly 47 is configured to mate or connect with another structure, such as a building, at an elevated height. This provides an elevated platform in which to load and unload passengers and/or supplies. The second inner bridge member 47b can include one or more mechanisms to connect with the structure including, but not limited to hooks, brackets, and clamps. The connection to the structure can be made via a window, ledge, or rooftop, for example.

The hydraulically-extendable bridge assembly 47 can be utilized for maneuvers, such as fire and rescue operations, hostage situations, delivery of food and/or medical supplies to persons held or stranded in a building, rescue of injured or ill patients stranded within the building, etc. The hydraulically-extendable bridge assembly 47 of multi-mode aerial vehicle 100 can also be used for similar situations in a military environment.

Figure 26:
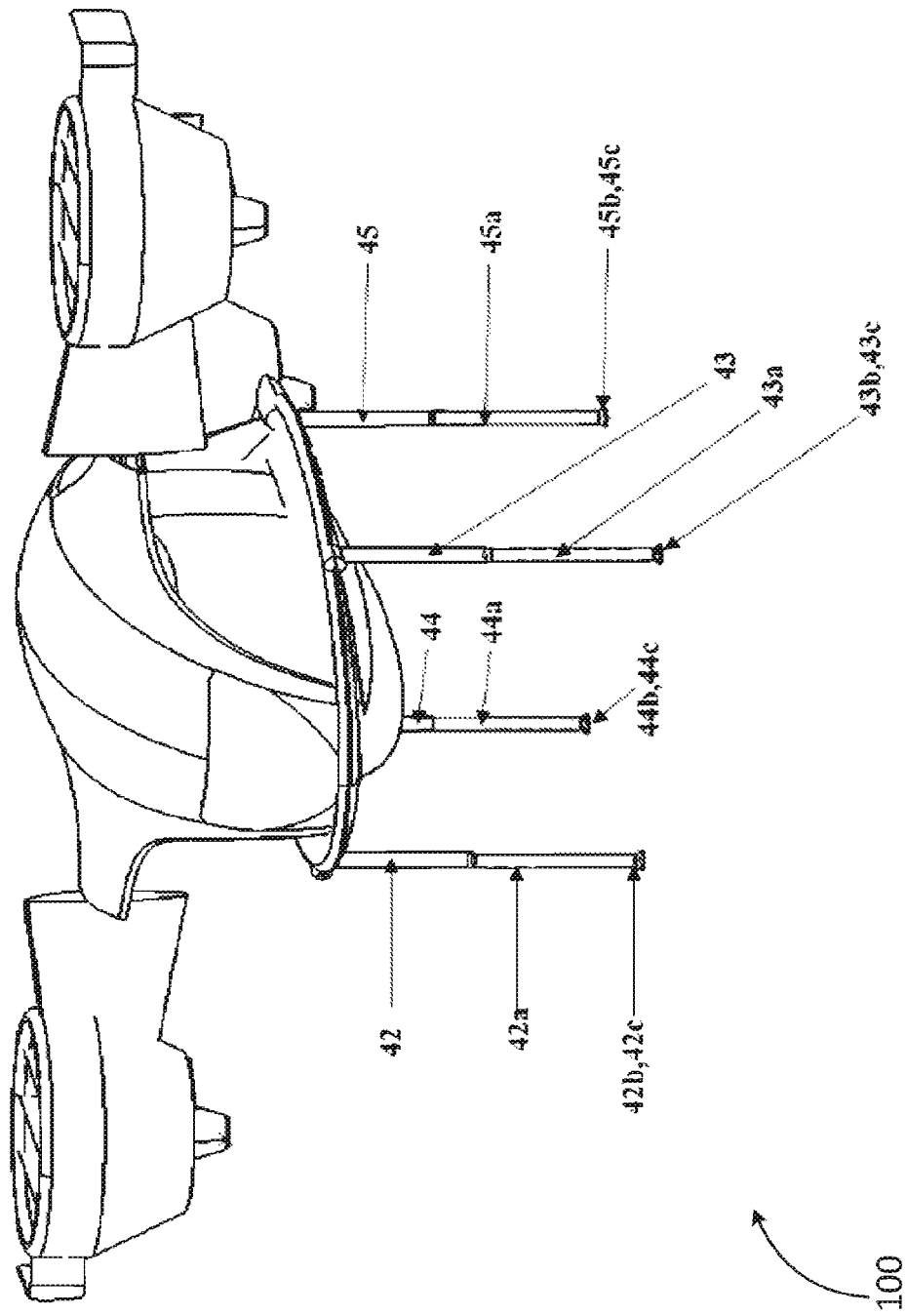
FIG. 26 illustrates landing gear structures according to one embodiment.

FIG. 26 illustrates landing gear structures of multi-mode aerial vehicle 100 in a front perspective view. Multi-mode aerial vehicle 100 is supported by four adjustable and slidable landing gear structures. In one embodiment, the adjustable and slidable landing gear structures are made of steel circular cross-sectional tubes, which attach to the flat base 8 of multi-mode aerial vehicle 100. However, less than four or more than four adjustable and slidable landing gear structures are contemplated by embodiments described herein, such as three, five, or six adjustable and slidable landing gear structures. The multiple adjustable and slidable landing gear structures allow the multi-mode aerial vehicle 100 to land in small areas and on rough terrain, which is outside of an airport or landing strip. In addition, a landing pad is not required for the multi-mode aerial vehicle 100 to land.

FIG. 26 illustrates a right front adjustable and slidable landing gear outer leg member 42. A right front inner leg member 42a coarsely slides and extends from the right front adjustable and slidable landing gear outer leg member 42. A right front loading force-sensitive contact sensor 42b is located at a lower end of the right front inner leg member 42a. The right front loading force-sensitive contact sensor 42b is configured to detect terrain as multi-mode aerial vehicle 100 descends and to obtain data from the right front loading force-sensitive contact sensor 42b, which is interpreted in real-time by the integrated flight control system 50. A right front small rubber foot 42c is located over the right front loading force-sensitive contact sensor 42b and the lower end of the right front inner leg member 42a.

FIG. 26 also illustrates a left front adjustable and slidable landing gear outer leg member 43. A left front inner leg member 43a coarsely slides and extends from the left front adjustable and slidable landing gear outer leg member 43. A left front loading force-sensitive contact sensor 43b is located at a lower end of the left front inner leg member 43a. A left front small rubber foot 43c is located over the left front loading force-sensitive contact sensor 43b and the lower end of the left front inner leg member 43a.

FIG. 26 also illustrates a right rear adjustable and slidable landing gear outer leg member 44. A right rear inner leg member 44a coarsely slides and extends from the right rear adjustable and slidable landing gear outer leg member 44. A right rear loading force-sensitive contact sensor 44b is located at a lower end of the right rear inner leg member 44a. A right rear small rubber foot 44c is located over the right rear loading force-sensitive contact sensor 44b and the lower end of the right rear inner leg member 44a.

FIG. 26 also illustrates a left rear adjustable and slidable landing gear outer leg member 45. A left rear inner leg member 45a coarsely slides and extends from the left rear adjustable and slidable landing gear outer leg member 45. A left rear loading force-sensitive contact sensor 45b is located at a lower end of the left rear inner leg member 45a. A left rear small rubber foot 45c is located over the left rear loading force-sensitive contact sensor 45b and the lower end of the left rear inner leg member 45a.

Figure 27:
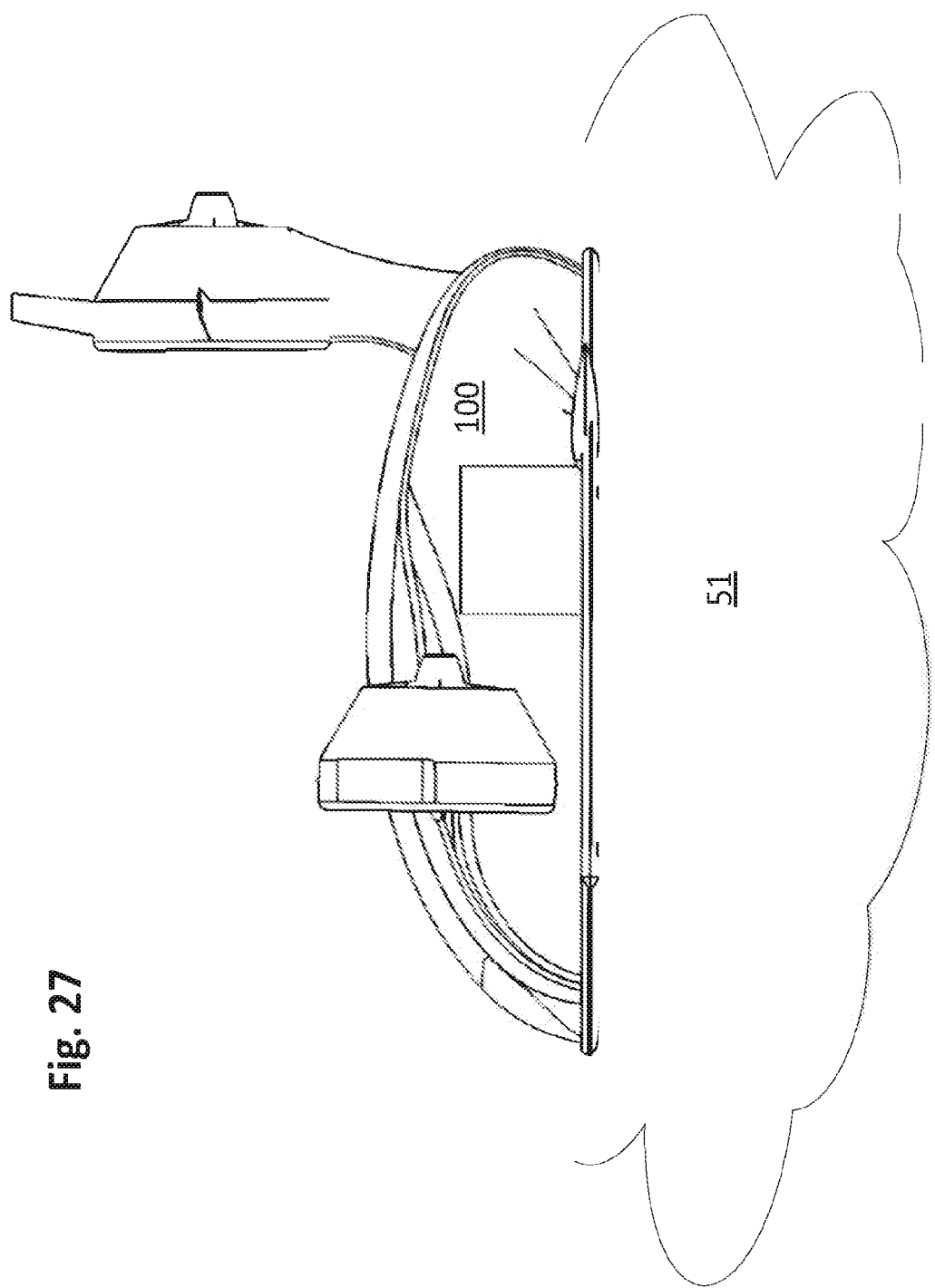
FIG. 27 illustrates a multi-mode aerial vehicle landing on a body of water according to one embodiment.

FIG. 27 illustrates multi-mode aerial vehicle 100 landing on a body of water 51. Multi-mode aerial vehicle 100 is configured to take off and land on the body of water 51, as well as cruise over water surfaces.

Embodiments described herein include a multi-mode aerial vehicle hybrid wing, configured to be attached at a side of an aerial vehicle fuselage, along with an opposing hybrid wing on an opposite side of the aerial vehicle fuselage. The multi-mode aerial vehicle hybrid wing includes the benefits and capabilities provided by a fixed-wing configuration, a tilt-wing configuration, a ducted fan configuration, and a counter-rotating rotor configuration. This delivers a combined benefit of helicopters and fixed-wing aircrafts in a tilt-wing tri-ducted fan platform.

The multi-mode aerial vehicle hybrid wing includes a fixed wing configured to extend from a side of an elongated fuselage. The fixed wing is doubled over its longitudinal axis. A tilt wing is attached at a first side to a free end of the fixed wing. The tilt wing is configured to rotate ninety degrees about its axis and is controlled by an integrated flight control system, such as integrated flight control system 50.

A duct is attached to a second side of the tilt wing. The duct includes a plurality of pivotal control surfaces positioned at a top entrance of the duct, dual counter-rotating rotors positioned at an underside of the duct, an engine centrally located within the duct, a plurality of cross stators positioned at a back entrance of the duct, and a plurality of stator pivotal control surfaces within each of the cross stators of the duct. The plurality of pivotal control surfaces, the dual counter-rotating rotors, the engine, the plurality of cross stators, and the plurality of stator pivotal control surfaces are controlled via processing circuitry of the integrated flight control system. The multi-mode aerial vehicle hybrid wing also includes a winglet attached to the duct opposite to the tilt wing.

In an embodiment, a tilting mechanism is configured to couple, via a gearbox, a first shaft integrated with the tilt wing. The tilting mechanism is also configured to couple a second shaft with an opposite tilt wing and to couple a vertically-oriented rear shaft with a tilt tail of a multi-mode aerial vehicle. In another embodiment, a material is integrated within walls of the diamond-shaped duct, such as a noise-blocking material or an insulation material.

Embodiments described herein include a multi-mode aerial vehicle hybrid tail, which is configured to be located at a rear side of a multi-mode aerial vehicle. The multi-mode aerial vehicle hybrid tail includes the benefits and capabilities provided by a tilt-tail configuration, a ducted fan configuration, and a counter-rotating rotor configuration.

The multi-mode aerial vehicle hybrid tail includes a tilt-tail section configured to fit within a curved guide slot at a rear end of an elongated fuselage. The tilt-tail section is configured to rotate ninety degrees within the curved guide slot.

The multi-mode aerial vehicle hybrid tail also includes a duct attached to the tilt-tail section at an opposite end to the curved guide slot. The duct includes a plurality of pivotal control surfaces positioned at a top entrance of the duct, dual counter-rotating rotors positioned at an underside of the duct, a plurality of cross stators positioned at a back entrance of the duct, and a plurality of stator pivotal control surfaces within each of the cross stators of the duct. The multi-mode aerial vehicle hybrid tail also includes a vertical stabilizer attached to the duct at an opposite side to the tilt-tail section, a first horizontal stabilizer attached to the duct at a first side, and a second horizontal stabilizer attached to the duct at a second opposite side.

In an embodiment, the multi-mode aerial vehicle hybrid tail also includes a tilting mechanism coupling, via a gearbox, a rear shaft with the tilt-tail section. The tilting mechanism further couples a first and a second shaft with an opposing pair of multi-mode aerial vehicle hybrid wings. In another embodiment, a material is integrated within walls of the duct, such as a noise-blocking material or an insulation material.

Figure 28:
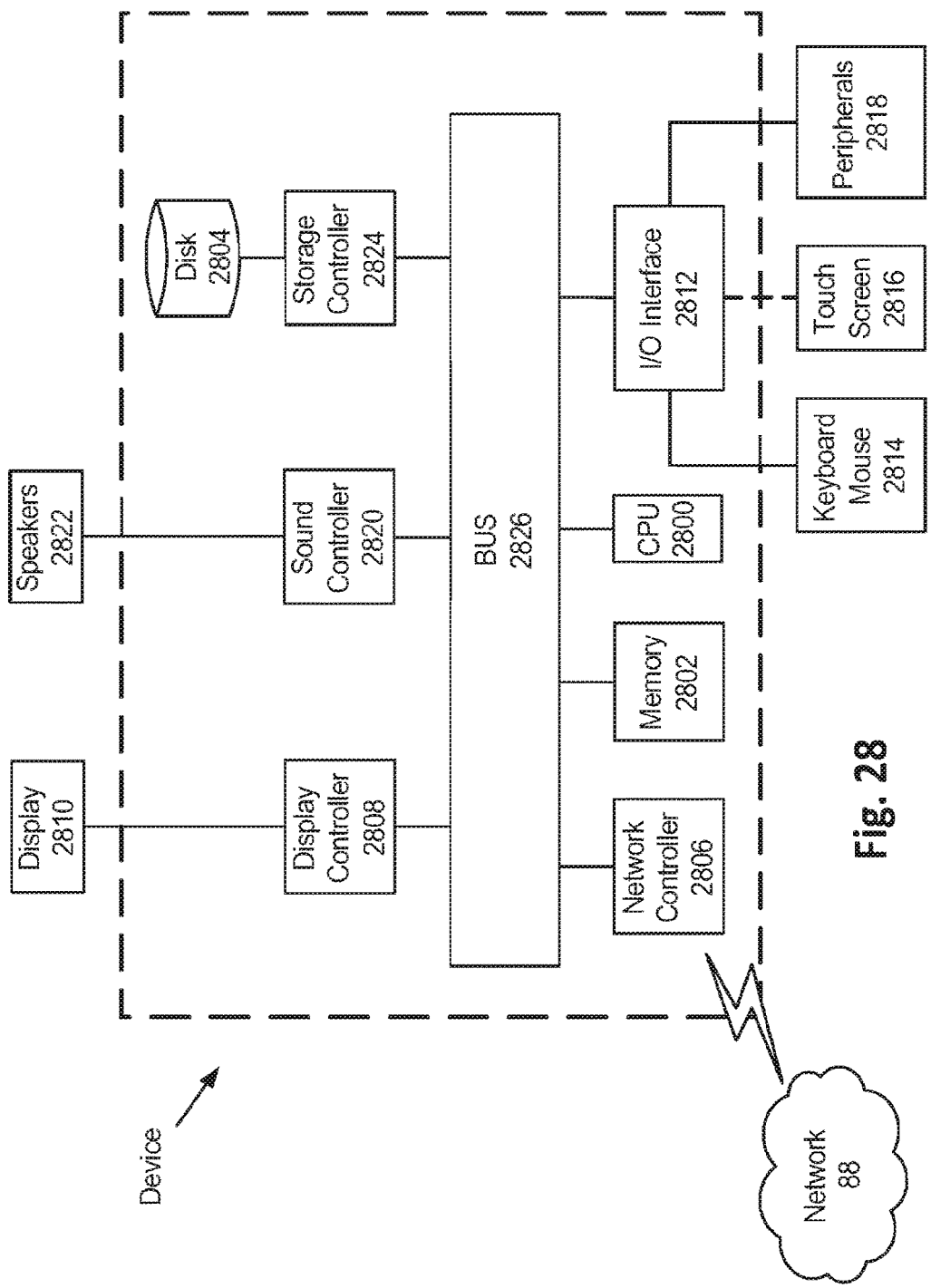
FIG. 28 illustrates a hardware description of an exemplary computing device according to one embodiment.

A hardware description is given with reference to FIG. 28 of a computing device, such as integrated flight control system 50, which is used in conjunction with associated processing circuitry for embodiments described herein. The processing circuitry represents hardware and software components whereby elements of disclosures noted herein are programmed. The programming in hardware and software constitutes algorithmic instructions to execute the various functions and acts noted and described herein. The computing device described herein can include one or more types of wireless and/or portable computing devices. The computing device described herein can also include physically separated devices that operate within a network.

In FIG. 28, the computing device includes a CPU 2800 which performs the processes described above. The process data and instructions may be stored in memory 2802. These processes and instructions may also be stored on a storage medium disk 2804 such as a hard disc drive (HDD) or portable storage medium, or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates.

Further, embodiments may be provided as a utility application, background daemon, or component of an operating system, or combination thereof, executing in conjunction with CPU 2800 and an operating system such as Microsoft Windows, UNIX, Solaris, LINUX, Apple MAC-OS and other systems known to those skilled in the art.

CPU 2800 may be a Xenon or Core processor from Intel of America or an Opteron processor from AMID of America, or may be other processor types that would be recognized by one of ordinary skill in the art. Alternatively, the CPU 2800 may be implemented on an Field Programmable Grid-Array (FPGA), Application-Specific Integrated Circuit (ASIC), Programmable Logic Device (PLD), or using discrete logic circuits, as one of ordinary skill in the art would recognize. Further, CPU 2800 may be implemented as multiple processors cooperatively working in parallel to perform the instructions of the inventive processes described above.

The computing device in FIG. 28 also includes a network controller 2806, such as an Intel Ethernet PRO network interface card from Intel Corporation of America, for interfacing with network 88. As can be appreciated, the network 88 can be a public network, such as the Internet, or a private network such as an LAN or WAN network, or any combination thereof and can also include PSTN or ISDN sub-networks. The network 88 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2808, such as a NVIDIA GeForce GTX or Quadro graphics adaptor from NVIDIA Corporation of America for interfacing with display 2810, such as a Hewlett Packard HPL2445w LCD monitor. A general purpose I/O interface 2812 interfaces with a keyboard and/or mouse 2814 as well as a touch screen panel 2816 on or separate from display 2810. General purpose I/O interface 2812 also connects to a variety of peripherals 2818 including printers and scanners, such as an OfficeJet or DeskJet from Hewlett Packard.

A sound controller 2820 is also provided in the computing device, such as Sound Blaster X-Fi Titanium from Creative, to interface with speakers/microphone 2822 thereby providing sounds and/or music. The general purpose storage controller 2824 connects the storage medium disk 2804 with communication bus 2826, which may be an ISA, EISA, VESA, PCI, or similar, for interconnecting all of the components of the computing device. A description of the general features and functionality of the display 2810, keyboard and/or mouse 2814, as well as the display controller 2808, storage controller 2824, network controller 2806, sound controller 2820, and general purpose I/O interface 2812 is omitted herein for brevity.

The computing devices used with embodiments described herein may not include all features described in FIG. 28. In addition, other features used with embodiments described herein may not be described with reference to FIG. 28.

Figure 29:
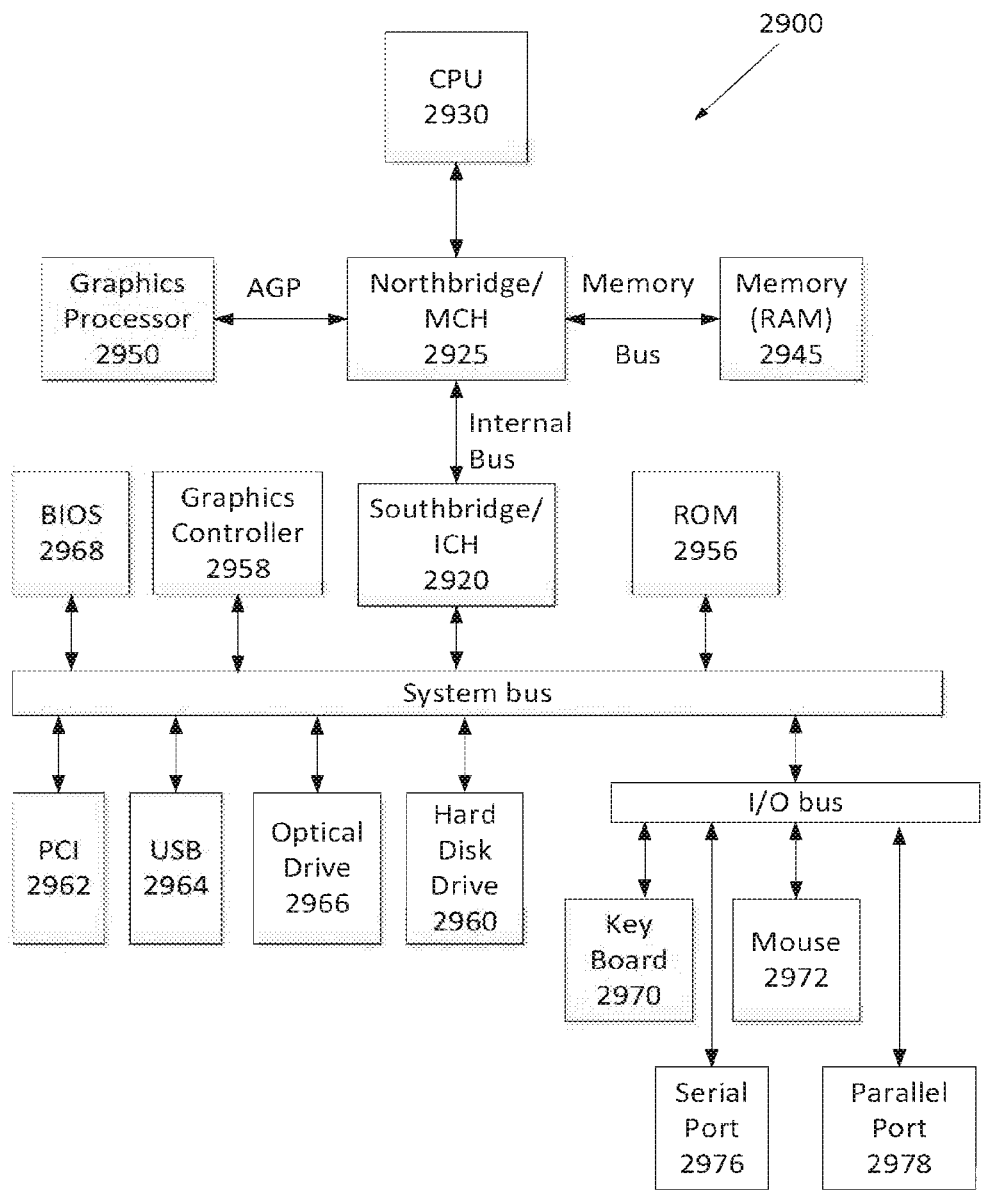
FIG. 29 is a schematic diagram of an exemplary data processing system according to one embodiment.

FIG. 29 is a schematic diagram of an exemplary data processing system, according to certain embodiments described herein. The data processing system is an example of a computer in which code or instructions implementing the processes of the illustrative embodiments can be executed.

In FIG. 29, data processing system 2900 employs an application architecture including a north bridge and memory controller application (NB/MCH) 2925 and a south bridge and input/output (I/O) controller application (SB/ICH) 2920. The central processing unit (CPU) 2930 is connected to NB/MCH 2925. The NB/MCH 2925 also connects to the memory 2945 via a memory bus, and connects to the graphics processor 2950 via an accelerated graphics port (AGP). The NB/MCH 2925 also connects to the SB/ICH 2920 via an internal bus (e.g., a unified media interface or a direct media interface). The CPU 2930 can include one or more processors and/or can be implemented using one or more heterogeneous processor systems.

Figure 30:
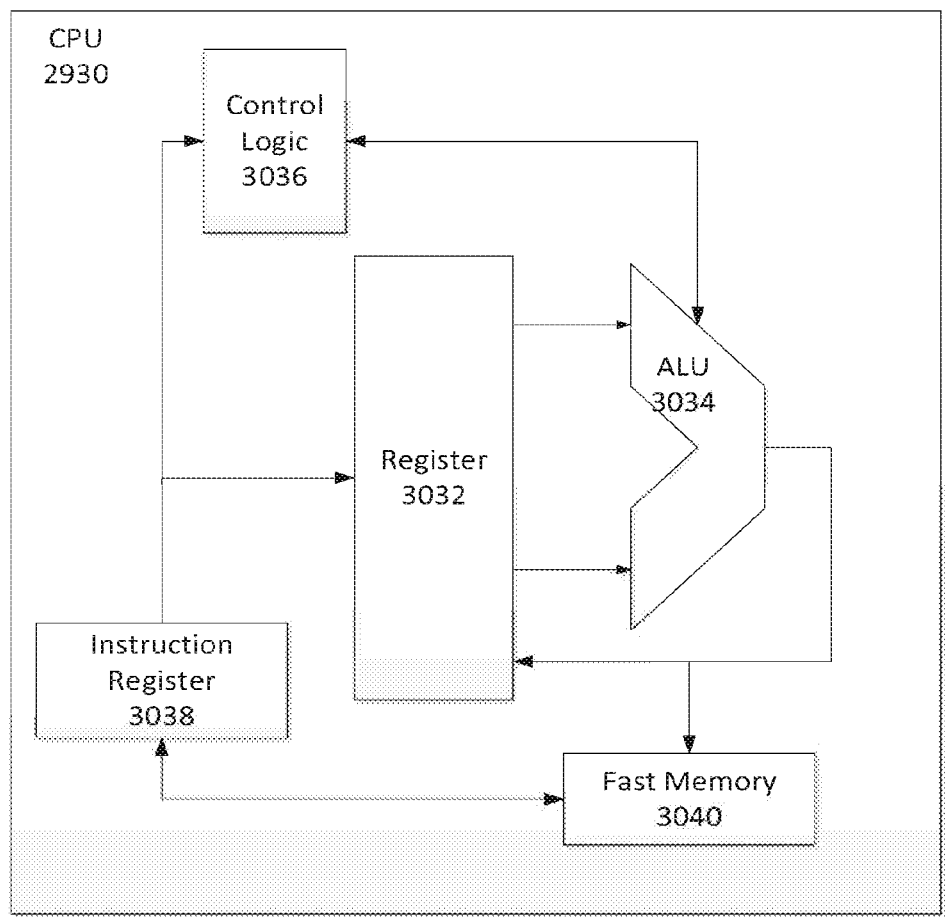
FIG. 30 is a schematic diagram of an exemplary central processing unit (CPU) according to one embodiment.

For example, FIG. 30 shows one implementation of CPU 2930. In one implementation, an instruction register 3038 retrieves instructions from a fast memory 3040. At least part of these instructions are fetched from an instruction register 3038 by a control logic 3036 and interpreted according to the instruction set architecture of the CPU 2930. Part of the instructions can also be directed to a register 3032. In one implementation the instructions are decoded according to a hardwired method, and in another implementation the instructions are decoded according to a microprogram that translates instructions into sets of CPU configuration signals that are applied sequentially over multiple clock pulses.

After fetching and decoding the instructions, the instructions are executed using an arithmetic logic unit (ALU) 3034 that loads values from the register 3032 and performs logical and mathematical operations on the loaded values according to the instructions. The results from these operations can be fed back into the register 3032 and/or stored in a fast memory 3040. According to certain implementations, the instruction set architecture of the CPU 2930 can use a reduced instruction set architecture, a complex instruction set architecture, a vector processor architecture, or a very large instruction word architecture. Furthermore, the CPU 2930 can be based on the Von Neuman model or the Harvard model. The CPU 2930 can be a digital signal processor, an FPGA, an ASIC, a PLA, a PLD, or a CPLD. Further, the CPU 2930 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 29, the data processing system 2900 can include the SB/ICH 2920 being coupled through a system bus to an I/O bus, a read only memory (ROM) 2956, universal serial bus (USB) port 2964, a flash binary input/output system (BIOS) 2968, and a graphics controller 2958. PCI/PCIe devices can also be coupled to SB/ICH 2920 through a PCI bus 2962.

The PCI devices can include, for example, Ethernet adapters, add-in cards, and PC cards for notebook computers. A Hard disk drive 2960 and CD-ROM 2966 can use, for example, an integrated drive electronics (IDE) or serial advanced technology attachment (SATA) interface. In one implementation the I/O bus can include a super I/O (SIO) device.

Further, the HDD 2960 and optical drive 2966 can also be coupled to the SB/ICH 2920 through a system bus. In one implementation, a keyboard 2970, a mouse 2972, a parallel port 2978, and a serial port 2976 can be connected to the system bus through the I/O bus. Other peripherals and devices can be connected to the SB/ICH 2920 using a mass storage controller such as SATA or PATA, an Ethernet port, an ISA bus, a LPC bridge, SIMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Conventional fixed-wing aircrafts, seaplanes, and hovering aircrafts are generally designed for specific functions and are therefore, not conveniently capable of performing a multiplicity of functions. The multi-mode aerial vehicle described herein has the flexibility and attributes of helicopters, fixed-wing aircrafts, and WIG vehicles. The multi-mode aerial vehicle is comparable in mission and output to helicopters, fixed-wing aircrafts, seaplanes, and hovering aircrafts combined.

In addition to the combined hybrid aerial vehicle features, embodiments described herein for an aerial vehicle include a sliding door and a hydraulically extendable bridge located at a side of the aerial vehicle. Hydraulically-extendable landing gear legs slide up while the aerial vehicle is flying and slide down when the aerial vehicle is preparing to land on highways or uneven surfaces. These features can be utilized for search and rescue (SAR) applications when a delivery time is a key factor to the survival of people. In addition, the SAR capabilities can be utilized in skyscrapers and/or towers during fire incidents, terrorist attacks, and/or hostage situations. The maintenance of a landing pad on a skyscraper or tower can be expensive and time consuming. However, the aerial vehicle described herein has a hydraulically-extendable bridge, which replaces the need for using ropes, cables, cages, ladders, and baskets during a SAR operation or a maintenance operation.

Embodiments described herein provide point-to-point, low-altitude, and medium-short distance air transportation services from one location to another that are typically difficult to access, such as inside an urban complex, close air spaces for military facilities and civilian installations, and natural environments. The aerial vehicle described herein can also be used as a personal air vehicle (PAV). The PAV serves as a manned platform to facilitate personal transportation, business transportation, public transportation, and maintenance operations. The PAV can also serve as an air medical platform or an air ambulance during vehicle accidents, earthquakes, floods, firefighting, and terrorist attacks.

With minor modifications, the PAV can be used as a military platform to facilitate point-to-point logistical support, target destruction, aerial surveillance, troop supply and cargo missions, soldier medivac from a battlefield, and special-forces operations.

Embodiments described herein provide safer and quieter flight capabilities that are largely unmatched in most conventional fixed-wing aircrafts, seaplanes, and hovering aircrafts. The safety is improved by enclosing the rotor and engines inside of the diamond-shaped ducts, which prevents the engines and rotors from contact with other objects and prevents foreign object damage (FOD) to the rotors. The sets of three pivotal control surfaces evenly and vertically positioned at the top entrance of the diamond-shaped ducts, in addition to the set of large horizontally and vertically positioned stators at the exit end of the diamond-shaped ducts reduce the chances of debris or flying objects from entering one of the diamond-shaped ducts and striking a blade. The diamond-shaped ducts also secure the rotors and the engines from birds, cables, trees, and other hazards during flight, take-off, and landing. As a result, the aerial vehicle is less fragile.

The two large flexible rubber winglets attached to the right and left diamond-shaped ducts provide more aerodynamic efficiency in the HTOL mode. The two large flexible rubber winglets also enable the aerial vehicle to hover in direct contact with an object, such as a building, wall, or pipe, while in the VTOL mode. This feature provides a high safety level while operating the aerial vehicle in confined spaces and in close quarters to obstructions, residences, and people.

The diamond-shaped duct configuration optimizes reduced noise levels while operating inside of a complex urban area, as well as close air spaces for military facilities and civilian installations. The diamond-shaped duct noise is reduced by various acoustic treatments to deflect and absorb noise, and by utilizing noise-blocking and insulation material integrated within the duct walls. This offers better noise insulation as compared to conventional aerial vehicles.

The embodiments described herein include the aspects listed below.

(1) A multi-mode aerial vehicle, including: an elongated fuselage having a front end, a rear end with a curved guide slot, a right side, a left side, and a WIG-effect bottom; a right-fixed wing extending from the right side of the elongated fuselage; a right tilt wing attached at a first side to a free end of the right fixed wing, the right tilt wing being rotatable ninety degrees about is axis; a right duct attached to a second side of the right tilt wing; a right winglet attached to the right duct opposite to the right tilt wing; a left-fixed wing extending from the left side of the elongated fuselage; a left tilt wing attached at a first side to a free end of the left fixed wing, the left tilt wing being rotatable ninety degrees about its axis; a left duct attached to a second side of the left tilt wing; a left winglet attached to the left duct opposite to the left tilt wing; a tilt tail located within the curved guide slot at the rear end of the elongated fuselage, the tilt tail being rotatable ninety degrees within the curved guide slot; a tilting mechanism coupling, via a gearbox, a right shaft integrated with the right tilt wing, a left shaft integrated with the left tilt wing, and a rear shaft integrated with the tilt tail within the curved guide slot; and a rear duct attached to the tilt tail, the rear duct including a vertical stabilizer, a right horizontal stabilizer, and a left horizontal stabilizer.

(2) The multi-mode aerial vehicle of (1), wherein the right duct includes a plurality of pivotal control surfaces positioned at a top entrance of the right duct, dual counter-rotating rotors positioned at an underside of the right duct, an engine centrally located within the right duct, a plurality of cross stators positioned at a back entrance of the right duct, and a plurality of stator pivotal control surfaces within each of the cross stators of the right duct.

(3) The multi-mode aerial vehicle of either (1) or (2), wherein the left duct includes a plurality of pivotal control surfaces positioned at a top entrance of the left duct, dual counter-rotating rotors positioned at an underside of the left duct, an engine centrally located within the left duct, a plurality of cross stators positioned at a back entrance of the left duct, and a plurality of stator pivotal control surfaces within each of the cross stators of the left duct.

(4) The multi-mode aerial vehicle of any one of (1) to (3), wherein the rear duct includes a plurality of pivotal control surfaces positioned at a top entrance of the rear duct, dual counter-rotating rotors positioned at an underside of the rear duct, an engine centrally located within the rear duct, a plurality of cross stators positioned at a back entrance of the rear duct, and a plurality of stator pivotal control surfaces within each of the cross stators of the rear duct.

(5) The multi-mode aerial vehicle of any one of (1) to (4), wherein each of the right tilt wing, the left tilt wing, and the tilt tail are configured to rotate together for VTOL, STOL, and HTOL.

(6) The multi-mode aerial vehicle of any one of (1) to (5), wherein the WIG-effect bottom includes a surrounding ring cavity, at least one bottom stabilizer, and at least one rear stabilizer.

(7) The multi-mode aerial vehicle of any one of (1) to (6), wherein the WIG-effect bottom facilitates water landings and cruises over a water surface.

(8) The multi-mode aerial vehicle of any one of (1) to (7), further comprising a hydraulically-slidable landing gear assembly.

(9) The multi-mode aerial vehicle of any one of (1) to (8), wherein the hydraulically-slidable landing gear assembly includes a plurality of inner leg members adjustable and slidable within corresponding outer leg members attached to the WIG-effect bottom, a loading force-sensitive contact sensor attached to a bottom end of each of the inner leg members, and a foot attached to the bottom end of each of the inner leg members.

(10) The multi-mode aerial vehicle of any one of (1) to (9), further comprising a hydraulically-extendable bridge assembly.

(11) The multi-mode aerial vehicle of any one of (1) to (10), wherein the hydraulically-extendable bridge assembly includes a first inner bridge member slidable within an outer bridge member, and a second inner bridge member slidable within the first inner bridge member.

(12) The multi-mode aerial vehicle of any one of (1) to (11), further comprising a material integrated within walls of each of the right duct, the left duct, and the rear duct.

(13) The multi-mode aerial vehicle of any one of (1) to (12), wherein the multi-mode aerial vehicle includes a manned multi-mode aerial vehicle.

(14) A multi-mode aerial vehicle hybrid wing, including a fixed wing configured to extend from a side of an elongated fuselage and double over its longitudinal axis; a tilt wing attached at a first side to a free end of the fixed wing, the tilt wing being rotatable ninety degrees about its axis; a duct attached to a second side of the tilt wing, the duct including a plurality of pivotal control surfaces positioned at a top entrance of the duct, dual counter-rotating rotors positioned at an underside of the duct, a plurality of cross stators positioned at a back entrance of the duct, and a plurality of stator pivotal control surfaces within each of the cross stators of the duct; and a winglet attached to the duct opposite to the tilt wing.

(15) The multi-mode aerial vehicle hybrid wing of (14), further comprising a tilting mechanism coupling, via a gearbox, a first shaft integrated with the tilt wing, and further coupling a second shaft with an opposite tilt wing and coupling a rear shaft with a tilt tail of a multi-mode aerial vehicle.

(16) The multi-mode aerial vehicle hybrid wing of either one of (14) or (15), further comprising a material integrated within walls of the duct.

(17) A multi-mode aerial vehicle hybrid tail, including a tilt-tail configured to fit within a curved guide slot at a rear end of an elongated fuselage, the tilt tail being rotatable ninety degrees within the curved guide slot; a duct attached to the tilt-tail at an opposite end to the curved guide slot, the duct including a plurality of pivotal control surfaces positioned at a top entrance of the duct, dual counter-rotating rotors positioned at an underside of the duct, a plurality of cross stators positioned at a back entrance of the duct, and a plurality of stator pivotal control surfaces within each of the cross stators of the duct; a vertical stabilizer attached to the duct at an opposite side to the tilt-tail; a first horizontal stabilizer attached to the duct at a first side; and a second horizontal stabilizer attached to the duct at a second opposite side.

(18) The multi-mode aerial vehicle hybrid tail of (17), further comprising a tilting mechanism coupling, via a gearbox, a rear shaft with the tilt-tail, and further coupling a first and a second shaft with an opposing pair of multi-mode aerial vehicle hybrid wings.

(19) The multi-mode aerial vehicle hybrid tail of either one of (17) or (18), further comprising a material integrated within walls of the duct.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative and not limiting thereof. The disclosure, including any readily discernible variants of the teachings herein, defines in part, the scope of the foregoing claim terminology.

The invention claimed is:

1. A multi-mode aerial vehicle, comprising:
    an elongated fuselage having a front end, a rear end with a curved guide slot, a right side, a left side, and a wing-in-ground (WIG) effect bottom;
    a right-fixed wing extending from the right side of the elongated fuselage;
    a right tilt wing attached at a first side to a free end of the right fixed wing, the right tilt wing being rotatable ninety degrees about its axis;
    a right duct attached to a second side of the right tilt wing;
    a right winglet attached to the right duct opposite to the right tilt wing;
    a left-fixed wing extending from the left side of the elongated fuselage;
    a left tilt wing attached at a first side to a free end of the left fixed wing, the left tilt wing being rotatable ninety degrees about its axis;
    a left duct attached to a second side of the left tilt wing;
    a left winglet attached to the left duct opposite to the left tilt wing;
    a tilt tail located within the curved guide slot at the rear end of the elongated fuselage, the tilt tail being rotatable ninety degrees within the curved guide slot;
    a tilting mechanism coupling, via a gearbox, a right shaft integrated with the right tilt wing, a left shaft integrated with the left tilt wing, and a rear shaft integrated with the tilt tail within the curved guide slot; and
    a rear duct attached to the tilt tail, the rear duct including a vertical stabilizer, a right horizontal stabilizer, and a left horizontal stabilizer.

2. The multi-mode aerial vehicle of claim 1, wherein the right duct includes a plurality of pivotal control surfaces positioned at a top entrance of the right duct,
    dual counter-rotating rotors positioned at an underside of the right duct,
    an engine centrally located within the right duct,
    a plurality of cross stators positioned at a back entrance of the right duct, and
    a plurality of stator pivotal control surfaces within each of the cross stators of the right duct.

3. The multi-mode aerial vehicle of claim 2, wherein the left duct includes
    a plurality of pivotal control surfaces positioned at a top entrance of the left duct,
    dual counter-rotating rotors positioned at an underside of the left duct,
    an engine centrally located within the left duct,
    a plurality of cross stators positioned at a back entrance of the left duct, and
    a plurality of stator pivotal control surfaces within each of the cross stators of the left duct.

4. The multi-mode aerial vehicle of claim 3, wherein the rear duct includes
    a plurality of pivotal control surfaces positioned at a top entrance of the rear duct,
    dual counter-rotating rotors positioned at an underside of the rear duct,
    an engine centrally located within the rear duct,
    a plurality of cross stators positioned at a back entrance of the rear duct, and
    a plurality of stator pivotal control surfaces within each of the cross stators of the rear duct.

5. The multi-mode aerial vehicle of claim 4, wherein each of the right tilt wing, the left tilt wing, and the tilt tail are configured to rotate for vertical take-off and landing (VTOL), short take-off and landing (STOL), and horizontal take-off and landing (HTOL).

6. The multi-mode aerial vehicle of claim 1, wherein the WIG-effect bottom includes
    a surrounding ring cavity,
    at least one bottom stabilizer, and
    at least one rear stabilizer.

7. The multi-mode aerial vehicle of claim 6, wherein the WIG-effect bottom facilitates water landings and cruises over a water surface.

8. The multi-mode aerial vehicle of claim 1, further comprising:
    a hydraulically-slidable landing gear assembly.

9. The multi-mode aerial vehicle of claim 8, wherein the hydraulically-slidable landing gear assembly includes
    a plurality of inner leg members adjustable and slidable within corresponding outer leg members attached to the WIG-effect bottom,
    a loading force-sensitive contact sensor attached to a bottom end of each of the inner leg members, and
    a foot attached to the bottom end of each of the inner leg members.

10. The multi-mode aerial vehicle of claim 1, further comprising:
    a hydraulically-extendable bridge assembly.

11. The multi-mode aerial vehicle of claim 10, wherein the hydraulically-extendable bridge assembly includes
    a first inner bridge member slidable within an outer bridge member, and
    a second inner bridge member slidable within the first inner bridge member.

12. The multi-mode aerial vehicle of claim 1, further comprising:
    a material integrated within walls of each of the right duct, the left duct, and the rear duct.

13. The multi-mode aerial vehicle of claim 1, wherein the multi-mode aerial vehicle includes a manned multi-mode aerial vehicle.

14. A multi-mode aerial vehicle hybrid wing, comprising:
a fixed wing configured to extend from a side of an elongated fuselage and double over its longitudinal axis
a tilt wing attached at a first side to a free end of the fixed wing, the tilt wing being rotatable ninety degrees about its axis;
a duct attached to a second side of the tilt wing, the duct including
  a plurality of pivotal control surfaces positioned at a top entrance of the duct,
  dual counter-rotating rotors positioned at an underside of the duct,
  a plurality of cross stators positioned at a back entrance of the duct, and
  a plurality of stator pivotal control surfaces within each of the cross stators of the duct; and
a winglet attached to the duct opposite to the tilt wing.

15. The multi-mode aerial vehicle hybrid wing of claim 14, further comprising:
a tilting mechanism coupling, via a gearbox, a first shaft integrated with the tilt wing, and further coupling a second shaft with an opposite tilt wing and coupling a rear shaft with a tilt tail of a multi-mode aerial vehicle.

16. The multi-mode aerial vehicle hybrid wing of claim 14, further comprising:
a material integrated within walls of the duct.

17. A multi-mode aerial vehicle hybrid tail, comprising:
a tilt-tail configured to fit within a curved guide slot at a rear end of an elongated fuselage, the tilt tail being rotatable ninety degrees within the curved guide slot;
a duct attached to the tilt-tail at an opposite end to the curved guide slot, the duct including
  a plurality of pivotal control surfaces positioned at a top entrance of the duct,
  dual counter-rotating rotors positioned at an underside of the duct,
  a plurality of cross stators positioned at a back entrance of the duct, and
  a plurality of stator pivotal control surfaces within each of the cross stators of the duct;
a vertical stabilizer attached to the duct at an opposite side to the tilt-tail;
a first horizontal stabilizer attached to the duct at a first side; and
a second horizontal stabilizer attached to the duct at a second opposite side.

18. The multi-mode aerial vehicle hybrid tail of claim 17, further comprising:
a tilting mechanism coupling, via a gearbox, a rear shaft with the tilt-tail, and further coupling a first and a second shaft with an opposing pair of multi-mode aerial vehicle hybrid wings.

19. The multi-mode aerial vehicle hybrid tail of claim 17, further comprising:
a material integrated within walls of the duct.

* * * * *